US005085676A

United States Patent [19]

Ekiner et al.

[11] Patent Number: 5,085,676

[45] Date of Patent: Feb. 4, 1992

[54] NOVEL MULTICOMPONENT FLUID SEPARATION MEMBRANES

[75] Inventors: Okan M. Ekiner, Wilmington, Del.; Richard A. Hayes, Parkersburg, W. Va.; Phillip Manos, Wilmington, Del.

[73] Assignee: E. I. du Pont de Nemours and Company, Wilmington, Del.

[21] Appl. No.: 622,419

[22] Filed: Dec. 4, 1990

[51] Int. Cl.[5] ...................... B01D 53/22; B01D 71/64; B01D 71/68

[52] U.S. Cl. ........................................ 55/158; 55/16; 210/500.23; 210/500.39.500.41; 264/41

[58] Field of Search ............... 55/16, 68, 158; 264/41; 210/500.23, 500.37, 500.38, 500.39, 500.41

[56] References Cited

U.S. PATENT DOCUMENTS

| | | | |
|---|---|---|---|
| 2,947,687 | 8/1960 | Lee | 210/23 |
| 2,953,502 | 9/1960 | Binning et al. | 202/42 |
| 2,960,462 | 11/1960 | Lee et al. | 208/308 |
| 2,966,235 | 12/1960 | Kammermeyer | 183/115 |
| 2,970,106 | 1/1961 | Binning et al. | 208/347 |
| 3,172,741 | 3/1965 | Jolley | 55/16 |
| 3,508,994 | 4/1970 | Nyrop | 156/280 |
| 3,616,607 | 11/1971 | Klass et al. | 55/16 |
| 3,648,845 | 3/1972 | Riley | 210/490 |
| 3,657,113 | 4/1972 | Stancell et al. | 210/23 |
| 4,071,590 | 1/1978 | Strathmann | 264/41 X |
| 4,086,310 | 4/1978 | Bottenbruch et al. | 264/41 |
| 4,113,628 | 9/1978 | Alegranti | 210/500 |
| 4,132,824 | 1/1979 | Kimura et al. | 428/220 |
| 4,155,793 | 5/1979 | Salemme et al. | 156/246 |
| 4,156,597 | 5/1979 | Browall | 55/16 |
| 4,164,437 | 8/1979 | Henne et al. | 264/41 X |
| 4,192,842 | 3/1980 | Kimura et al. | 264/298 |
| 4,260,652 | 4/1981 | Taketani et al. | 427/245 |
| 4,378,324 | 3/1983 | Makino et al. | 264/41 |
| 4,440,643 | 4/1984 | Makino et al. | 210/500.2 |
| 4,460,526 | 7/1984 | Makino et al. | 264/41 |
| 4,474,662 | 10/1984 | Makino et al. | 210/500.2 |
| 4,474,858 | 10/1984 | Makino et al. | 428/473.5 |
| 4,485,056 | 11/1984 | Makino et al. | 264/41 |
| 4,512,893 | 4/1985 | Makino et al. | 210/500.2 |
| 4,528,004 | 7/1985 | Makino et al. | 55/158 |
| 4,529,646 | 7/1985 | Sundet | 264/41 X |
| 4,602,922 | 7/1986 | Cabasso et al. | 55/158 |
| 4,664,669 | 5/1987 | Ohyabu et al. | 623/66 |
| 4,689,267 | 8/1987 | Takamizawa et al. | 428/376 |
| 4,713,292 | 12/1987 | Takemura et al. | 428/373 |
| 4,714,481 | 12/1987 | Matsuura et al. | 55/158 |
| 4,717,394 | 5/1988 | Hayes | 55/16 |
| 4,741,829 | 5/1988 | Takemura et al. | 210/500.23 |
| 4,756,932 | 7/1988 | Puri | 427/175 |
| 4,772,392 | 9/1988 | Sanders, Jr. et al. | 264/41 X |
| 4,826,599 | 5/1989 | Bikson et al. | 210/500.3 |
| 4,938,902 | 7/1990 | Nakamura et al. | 264/41 X |
| 4,955,993 | 9/1990 | Sanders, Jr. et al. | 264/41 X |
| 4,975,228 | 12/1990 | Sanders, Jr. et al. | 264/41 |
| 4,980,063 | 12/1990 | Mahoney et al. | 264/41 X |
| 5,009,824 | 4/1991 | Walch et al. | 264/41 X |
| 5,011,637 | 4/1991 | Overman, III et al. | 264/41 |

FOREIGN PATENT DOCUMENTS 62-253785 4/1989 Japan .

*Primary Examiner*—Robert Spitzer

[57] ABSTRACT

A process for preparing multicomponent gas separation membranes is disclosed. The process involves casting two or more solutions of polymer, and partially removing solvent from the side of the cast polymer that is to form the gas separation layer of the membrane. The membrane is then quenched to freeze its structure and then the remainder of the solvent removed to form the gas separation membrane.

78 Claims, No Drawings

NOVEL MULTICOMPONENT FLUID SEPARATION MEMBRANES

FIELD OF THE INVENTION

The present invention relates to fabrication of composite gas separation membranes.

BACKGROUND OF THE INVENTION

The separation of one or more gases from a complex multicomponent mixture of gases is necessary in a large number of industries. Such separations currently are undertaken commercially by processes such as cryogenics, pressure swing adsorption and membrane separations. In certain types of gas separations, membrane separations have been found to be economically more viable than other processes.

In a pressure driven gas membrane separation process, one side of the gas separation membrane is contacted with a complex multicomponent gas mixture and certain of the gases of the mixture permeate through the membrane faster than the other gases. Gas separation membranes thereby allow some gases to permeate through them while serving as a barrier to other gases in a relative sense. The relative gas permeation rate through the membrane is a property of the membrane material composition. It has been suggested in the prior art that the intrinsic membrane material selectivity is a combination of gas diffusion through the membrane, controlled in part by the packing and molecular free volume of the material, and gas solubility within the material. It is highly desirable to form defect free dense separating layers in order to retain high gas selectivity.

The preparation of commercially viable gas separation membranes has been greatly simplified with asymmetric membranes. Asymmetric membranes are prepared by the precipitation of polymer solutions in solvent-miscible nonsolvents. Such membranes are typified by a dense separating layer supported on an anisotropic substrate of a graded porosity and are generally prepared in one step. Examples of such membranes and their methods of manufacture are shown in U.S. Pat. Nos. 4,113,628; 4,378,324; 4,460,526; 4,474,662; 4,485,056; and 4,512,893. U.S. Pat. No. 4,717,394 shows preparation of asymmetric separation membranes from selected polyimides.

A shortcoming of asymmetric gas separation membranes concerns the stability of these membranes under end use environmental conditions because asymmetric membranes are typically composed of homogeneous materials. That is to say, the dense separating layer and the porous substrate layer of the membrane are compositionally the same.

For some gas separations, such as acid gas separations, it has been found advantageous in the prior art to employ separating membranes comprising materials which have high intrinsic acid gas solubility. However, asymmetric membranes prepared from materials with high acid gas solubilities tend to plasticize and undergo compaction under acid gas separation end use conditions. In addition, asymmetric membranes may be plasticized and compacted due to components such as water which may be in the gas mixtures to be separated. As a result, asymmetric gas separation membranes prepared from hydrophilic materials may be adversely affected under such conditions.

Composite gas separation membranes typically have a dense separating layer on a preformed microporous substrate. The separating layer and the substrate are usually different in composition. Examples of such membranes and their methods of manufacture are shown in U.S. Pat. Nos. 4,664,669; 4,689,267; 4,741,829; 2,947,687; 2,953,502; 3,616,607; 4,714,481; 4,602,922; 2,970,106; 2,960,462; and 4,713,292, as well as in Japanese 63-218213.

U.S. Pat. No. 4,664,669 discloses hollow fiber composite membranes of a dense, polyorganosilane polymer and an ultra-microporous layer supported on a porous substrate. U.S. Pat. Nos. 4,689,267 and 4,714,481 show hollow fiber composite membranes that include a dense coating of a poly(silylacetylene) on a porous hollow fiber support. U.S. Pat. No. 4,741,829 shows bicomponent, melt-spun hollow fiber membranes. U.S. Pat. No. 4,826,599 shows forming hollow fiber composite membranes by coating a porous hollow fiber substrate with a solution of membrane forming material, and coagulating the membrane forming material. Japanese patent application 63-218,213, published Sept. 12, 1988, shows coextruding two solutions of polysulfone to form a composite membrane. U.S. Pat. No. 2,947,687 shows composite membranes that include a thin layer of ethyl cellulose. U.S. Pat. No. 2,953,502 shows thin, non-porous plastic membranes. U.S. Pat. No. 2,970,106 shows composite membranes that include modified cellulose acetate-butyrate. U.S. Pat. No. 3,616,607 shows dense polyacrylonitrile film onto a nonporous preforms. U.S. Pat. No. 4,602,922 shows a polyorganosiloxane layer between a porous substrate and the dense separation layer of a composite membrane. U.S. Pat. No. 4,713,292 melt-spun, multi-layer composite hollow fiber membranes. U.S. Pat. No. 2,960,462 shows a non-porous selective film laminated onto a thicker, non-porous permeable film.

Composite gas separation membranes have evolved to a structure of an ultrathin, dense separating layer supported on an anisotropic, microporous substrate. These composite membrane structures can be prepared by laminating a preformed ultrathin dense separating layer on top of a preformed anisotropic support membrane by a multistep process. Examples of such membranes and their methods of manufacture are shown in U.S. Pat. Nos. 4,689,267; 4,741,829; 2,947,687; 2,953,502; 2,970,106; 4,086,310; 4,132,824; 4,192,824; 4,155,793; and 4,156,597.

U.S. Pat. No. 4,086,310 shows preparation of composite membranes from supported, ultra-thin, dense polycarbonate. U.S. Pat. Nos. 4,132,824 and 4,192,842 show ultra-thin dense 4-methylpentene film composite membranes. U.S. Pat. No. 4,155,793 shows composite membranes that include an ultra-thin, dense film on a porous substrate. U.S. Pat. No. 4,156,597 shows a composite membrane that includes an ultra-thin, dense polyetherimide separation layer.

Composite gas separation membranes are generally prepared by multistep fabrication processes. Typically, the preparation of composite gas separation membrane requires first forming an anisotropic, porous substrate. This is followed by contacting the substrate with a membrane-forming solution. Examples of such methods are shown in U.S. Pat. Nos. 4,826,599; 3,648,845; and 3,508,994.

U.S. 3,508,994 shows contacting a porous substrate with a membrane forming solution. U.S. Pat. No. 3,648,845 shows coating a porous substrate with a buffer layer followed by solution casting a separating layer of cellulose acetate. Dip coatinq a polymer solution onto the substrate also may be employed. Examples of such methods are shown in U.S. Pat. Nos. 4,260,652; 4,440,643; 4,474,858; 4,528,004; 4,714,481; and 4,756,932. U.S. Pat. No. 4,260,652 dip coats a polymer onto a substrate. U.S. Pat. No. 4,440,643; 4,474,858; and 4,528,004 show composite polyimide membranes formed by coating a substrate. U.S. Pat. No. 4,714,481 dipcoats polyacetylene onto a substrate to form a composite membrane. U.S. Pat. No. 4,756,932 shows forming composite hollow fiber membranes by dip coating.

The multistep fabrication processes of the prior art tend to be expensive and time consuming. In addition, the composite membranes produced by these multistep processes can experience failure and poor performance due to defects in the substrate and separating layer. A need therefore exists for a membrane and a process of manufacture which avoids the above shortcomings of the prior art membranes and processes.

SUMMARY OF THE INVENTION

The invention provides a multicomponent gas separation membrane prepared by novel process of simultaneously coextruding at least two film forming polymer solutions to form a nascent membrane, followed by precipitation to form a composite multicomponent membrane comprised of a dense or asymmetric gas separating layer and a microporous layer which structurally supports the separating layer. The film-forming polymer may be selected from polymers such as polysulfones, polyether sulfones, polyetherimides, polyimides or polyamides. The nascent membrane can be optionally partially dried prior to coagulating of the membrane in a fluid bath. The nascent membrane is quenched and then the remainder of the solvent is removed to form the gas separation membrane. The polymer solutions can be coextruded to form a multicomponent membrane with either of the polymer solutions forming the separating or support portion of the fiber.

The multicomponent membrane may be formed into hollow fibers as well as shapes such as films. The multicomponent membranes have at least two components comprising a first layer material for supporting a second, separating layer for separating gases. The second layer can be in the form of an asymmetric membrane which contains a dense gas separating layer on the exterior surface of the membrane.

DETAILED DESCRIPTION OF THE INVENTION

The present invention allows for ease of manufacture of multicomponent gas separation membranes. In manufacture of the membranes, a wide range of materials may be used as the gas separating layer. Suitable gas separating layer membrane materials may include those found generally useful for asymmetric gas separation membranes. These materials include polyamides, polyimides, polyesters, polycarbonates, copolycarbonate esters, polyethers, polyetherketones, polyetherimides, polyethersulfones, polysulfones, polyvinylidene fluoride, polybenzimidazoles, polybenzoxazoles, polyacrylonitrile, cellulosic derivatives, polyazoaromatics, poly(2,6-dimethylphenylene oxide), polyphenylene oxide, polyureas, polyurethanes, polyhydrazides, polyazomethines, polyacetals, cellulose acetates, cellulose nitrates, ethyl cellulose, styrene-acrylonitrile copolymers, brominated poly(xylylene oxide), sulfonated poly(xylylene oxide), tetrahalogen-substituted polycarbonates, tetrahalogen-substituted polyesters, tetrahalogen-substituted polycarbonate esters, polyquinoxaline, polyamideimides, polyamide esters, blends thereof, copolymers thereof, substituted materials thereof, and the like. In addition, suitable gas separating layer membrane materials may include those found useful as the dense separating layer of composite gas separation membranes. These materials include polysiloxanes, polyacetylenes, polyphosphazenes, polyethylenes, poly(4-methylpentene), poly(trimethylsilylpropyne), poly(trialkylsilylacetylenes), polyureas, polyurethanes, blends thereof, copolymers thereof, substituted materials thereof, and the like. It is further anticipated that polymerizable substances, that is, materials which cure to form a polymer, such as vulcanizable siloxanes and the like, may be suitable gas separating layers for the multicomponent gas separation membranes of the present invention. Preferred materials for the dense gas separating layer include aromatic polyamide and aromatic polyimide compositions.

The preferred aromatic polyimides for the gas separating layer have the formula

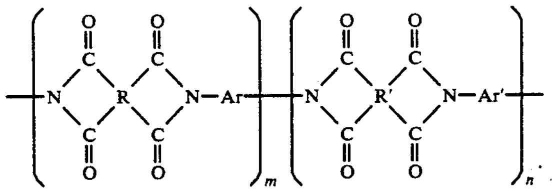

wherein R and R' are selected from the group of

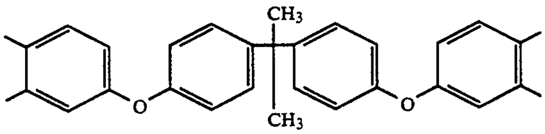

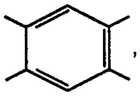
,
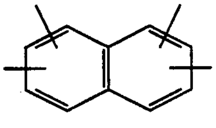
and

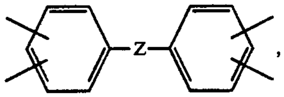
, where Z is a carbon-carbon bond,

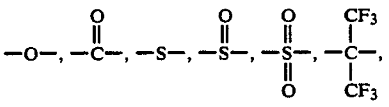

or alkylene groups of 1 to 5 carbon atoms; where Ar is one of either

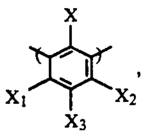
,
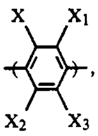
,

-continued

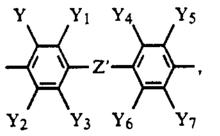

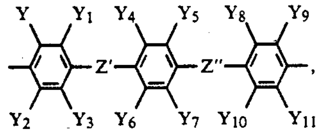

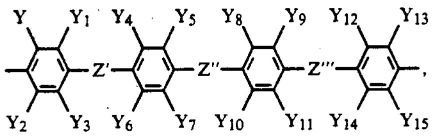

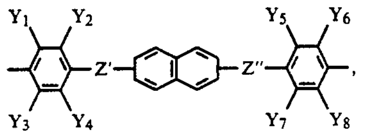

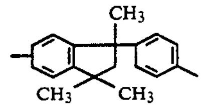

or mixtures thereof where Z', Z'', Z''' independently are a carbon-carbon bond,

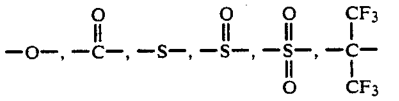

or alkylene groups of 1 to 5 carbon atoms; X, $X_1$, $X_2$, and $X_3$ independently are hydrogen, alkyl groups of 1 to 5 carbon atoms, alkoxy groups of 1 to 5 carbon atoms, phenyl or phenoxy groups; Y, $Y_1$, $Y_2$, $Y_3$, $Y_4$, $Y_5$, $Y_6$, $Y_7$, $Y_8$, $Y_9$, $Y_{10}$, $Y_{11}$, $Y_{12}$, $Y_{13}$, $Y_{14}$, and $Y_{15}$ independently are X, $X_1$, $X_2$, $X_3$ or halogen, Ar' is

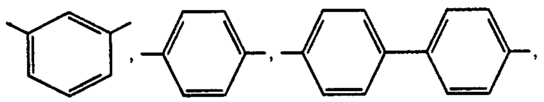

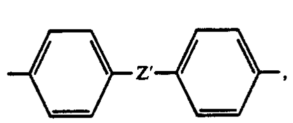

or mixtures thereof where Z' has the above-defined meaning, m is 0 to 100 mole percent, preferably 20 to 100%, n is 0 to 100 mole percent, preferably 20 to 80%, and (M+n)=100%.

The preferred aromatic polyamides useful as the dense separating layer have the formula:

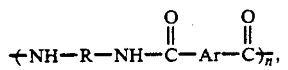

where R is one of either

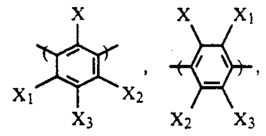

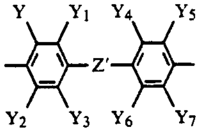

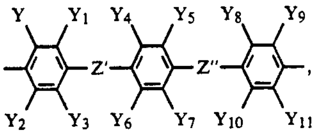

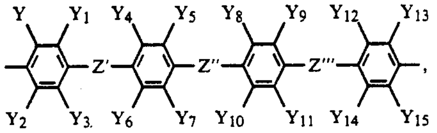

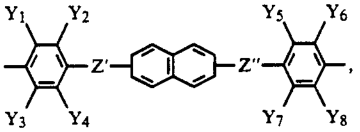

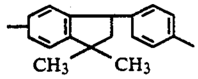

where Z', Z'', Z''' independently are a carbon-carbon bond,

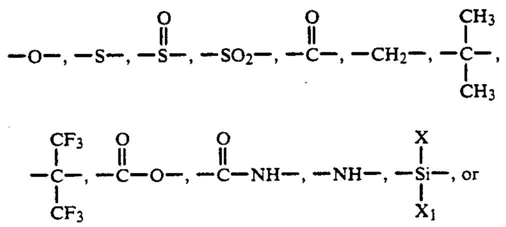

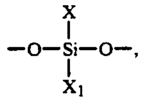

or mixtures thereof; Ar is one of either

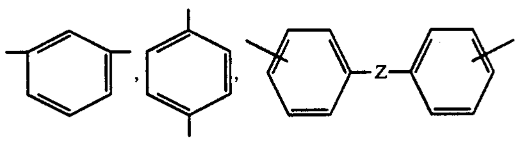

where Z is a carbon-carbon bond,

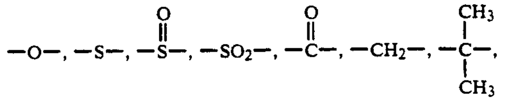

-continued

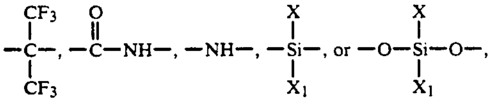

or mixtures thereof, n is an integer such that the polymer is of film forming molecular weight, X, $X_1$, $X_2$, and $X_3$ are independently, hydrogen, alkyl groups of 1 to 6 carbon atoms, alkoxy groups of 1 to 5 carbon atoms, phenyl or phenoxy groups; and Y, $Y_1$, $Y_2$, $Y_3$, $Y_4$, $Y_5$, $Y_6$ $Y_7$, $Y_8$, $Y_9$, $Y_{10}$, $Y_{11}$, $Y_{12}$, $Y_{13}$, $Y_{14}$, and $Y_{15}$ independently are X, $X_1$, $X_2$, $X_3$, halogen, or alkyl groups of 1 to 6 carbon atoms.

Suitable substrate layer materials for the membranes of the present invention may include polysulfone, polyether sulfone, polyamide, polyimide, polyetherimide, polyesters, polycarbonates, copolycarbonate esters, polyethers, polyetherketones, polyvinylidene fluoride, polybenzimidazoles, polybenzoxazoles, cellulosic derivatives, polyazoaromatics, poly(2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyquinoxaline, polyamideimides, polyamide esters, blends thereof, copolymers thereof, substituted materials thereof and the like. This should not be considered limiting since any material which can be fabricated into an anisotropic substrate membrane may find utility as the substrate layer of the present invention. Preferred materials for the substrate layer include polysulfone, polyethersulfone, polyetherimide, polyimide and polyamide compositions.

The preferred polyethersulfones are aromatic polysulfones of the formula:

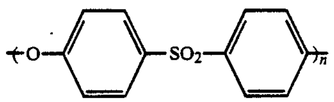

which is available under the trade name "Victrex" from ICI Corp.

The preferred polyethersulfones have the formula

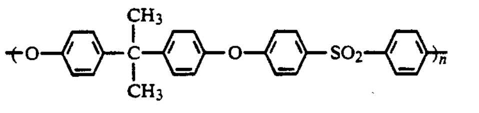

which are available from Amoco Corp. under the tradename "Udel".

Other preferred polysulfones have the formula:

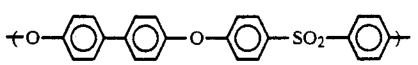

available from Amoco Corp. under the tradename "Radel".

The preferred polyetherimides have the formula:

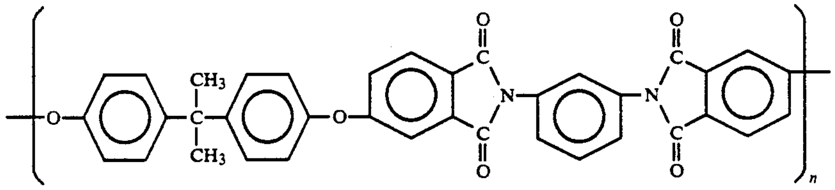

available from the General Electric Company under the tradename "Ultem".

The polymers for both the substrate or gas separating layer have a sufficiently high molecular weight to be film forming.

For the purpose of illustrating the invention, we exemplify forming multicomponent membranes with two components, that is, a gas separating component and a substrate component. This should not be considered limiting, however, since the multicomponent membranes of the present invention may incorporate more than two component layers. The additional layers may function as gas separating layers, structural layers, substrate layers, layers which reduce environmental concerns, or combinations thereof. These additional layers may contain the materials employed in the gas separating layer and the substrate layer.

The materials of each layer should be sufficiently compatible to ensure integrity of the composite membrane during processing or when employed in fluid separations such as gas separations.

As one knowledgeable in the prior art can ascertain, such properties can be modified by, for example, incorporating additives into the materials of the layers or through modification of the materials.

Multicomponent gas separation membranes of the present invention may be in the form of various shapes such as flat membranes or hollow fiber membranes. The membrane is preferably in the form of a hollow fiber due to the surface area advantages available. The flat film membranes may be prepared through coextrusion of the polymer solutions for the separating and support layers to form a nascent multilayer membrane. The nascent multilayer membrane is optionally dried under specified conditions and then precipitated in a coagulating bath that is a non-solvent for the film forming polymer but is a solvent of the polymer solvent. Coextrusion may be performed by use of well known multiple slit dies. For example, a bicomponent film membrane can be coextruded through a two-slit die. The nascent bicomponent film membrane can be supported on a plate, continuous roller, or fabric backing. Such a nascent bicomponent film can be optionally dried at from 10° C. to 200° C., preferably 25° C. to 100° C., for 0.01 to 10 minutes, preferably for 0.05 to 1.0 minutes, by passing the nascent bicomponent film through an oven. The nascent bicomponent film is then precipitated in the coagulating bath.

Multicomponent hollow fiber membranes in the form of hollow fibers may be formed by coextrusion of the support polymer and separating polymer solutions. For example, polymer solutions for the layers may be coextruded through a multiple channel spinneret while maintaining a gas pressure or a bore fluid in the nascent hollow fiber bore to maintain the fiber's structural integrity. Such multiple channel spinnerets have been described in the prior art for use in melt extrusion of multicomponent fibers.

The nascent coextruded hollow fiber membrane optionally may be dried by passing the nascent fiber through an air gap of from 0.1 cm to 6 m, preferably from 0.1 cm to 20 cm, at a temperature of from 10° C. to 250° C., preferably from 20° C. to 100° C., for a time dependent on the coextrusion rate and the fiber takeup speed, generally between $10^{-6}$ to 5 minutes, preferably between 0.001 to 1 minute. The nascent fiber is then drawn into a coagulating bath. The thus formed multicomponent hollow fiber membranes are wound onto a drum or other suitable collection device.

During fabrication of the hollow fiber membranes, the separating layer is preferably formed on the outside surface of the fiber to maximize the membrane surface area exposed to the gas. However, the separating layer also may be formed as the inner layer of the fiber. The multicomponent hollow fiber membrane of the present invention may have an outside diameter of about 75 to 1,000 microns, preferably 100 to 350 microns, and a wall thickness of about 25 to 300 microns, preferably 25 to 75 microns. Preferably the diameter of the bore of the fiber is about one-half to three-quarters of the outside diameter of the fiber.

The porosity of the resultant membrane is sufficient so that the void volume of the membrane is within the range of 10 to 90 percent, preferably about 30 to 70 percent, based on the volume contained within the gross dimensions of the overall multicomponent membrane.

Coextrusion, and the apparatus and processes therein, of polymers is well known in the art. Use of solution coextrusion techniques as in the present invention for the fabrication of multicomponent gas separation membranes, however, is novel and surprising. The optional drying step and the coagulation processes described above also are well known in the prior art for manufacture of monolithic asymmetric membranes. The application of such processes for the fabrication of multicomponent membranes, however, is surprising and novel.

In order to select suitable materials for use as the separating layer and/or substrate layer of the multicomponent membranes, a two step process for the fabrication of bicomponent membranes may be employed. This process entails casting a polymer solution onto a glass plate at a specified temperature with a casting knife, for example, a knife gap of 15 mils ($3.8\times10^{-4}$ m) to form a nascent substrate layer. After drying on the plate for a specified time, the separating layer polymer solution is cast on top of the substrate layer through use of a larger knife gap, for example, a knife gap of 20 mils ($5.1\times10^{-4}$ m) After drying for a specified time and temperature, the resultant nascent bicomponent film is coagulated in a bath that is a nonsolvent for the polymers but which is a solvent for the solvents of the polymeric solutions employed to form the separating and substrate layers.

Selection of the polymer solutions for use in the production of the various layers of the multicomponent membrane may be made depending on, for example, the solubility characteristics of the polymer and the desired end use of the layer. Typically, such polymer solutions are similar to those described in the prior art for asymmetric membranes. The amount of polymer in each solution independently may vary from about 1 to 60 weight percent, preferably 15 to 35 weight percent.

Typical solvents for the polymer solutions include solvents such as dimethyl formamide, N,N-dimethylacetamide, N-methylpyrrolidone, dimethyl sulfoxide and the like. These solvents are useful with the preferred polymer materials of the present invention, that is polysulfone, polyethersulfone, polyamide, polyimide and polyetherimide. These solvents, however, are merely illustrative and should not be considered limiting.

Mixtures of solvents also may be used in the polymer solutions employed to form the layers of the membrane. The specific mixture of solvents may vary depending on the solubility parameters of the polymer and the desired use of the layer. For example, two or more solvents may be used which vary in volatility or solvation power. Specific examples of polymer solutions which include mixtures of solvents for use with a variety of polymeric materials are exemplified herein.

The solvent mixture also may contain additional components such as polymer swelling agents, and nonsolvent components. These added components may be useful, for example, to achieve a desired anisotropy in a layer by moving the polymer solution closer to its point of incipient gelation. These additional components may be characterized as extractable or nonextractable in the coagulation bath. Extractable components, that is, materials which are extractable in an aqueous-based coagulation bath, may be useful, for example, as pore formers in a layer. Examples of extractable components include inorganic salts, and polymers such as polyvinyl pyrrolidone. . Nonextractable components may find utility as, for example, membrane permeation modifiers. Nonextractable materials vary in composition dependent on the end use desired for the layer and the composition of the polymer, solvent mixture and coagulation bath. Examples of the additional components which may be employed include, for example, discrete monomeric materials which are insoluble in the composition of the coagulation bath, polymerizable materials such as moisture-curable siloxanes, and compatible or non-compatible polymers. The foregoing examples of additional components are merely illustrative and should not be considered limiting.

Suitable coagulation baths for the nascent multicomponent membranes vary depending on the composition of the polymer solutions employed and the results desired. Generally, the coagulation bath is miscible with the solvent of the solvent mixture, but is a non solvent for the polymers of each layer. However, the coagulation bath may be varied to achieve desired properties in the layer. This may be desirable depending on the solubility parameters of the separating layer polymer, or when specialized membrane configurations are desired. For example, the solvent of the separating layer polymer solution may be immiscible in the coagulation bath whereas the solvent of the substrate layer polymer solution may be miscible in the coagulation bath. A coagulation bath therefore may be a multicomponent mixture of water and an organic solvent that is miscible with water and the solvent to be removed from the polymer. The temperature and composition of the bath also may be controlled to affect the extent and rate of coagulation.

The Nascent multicomponent membranes can be dried by air drying or other prior art processes. For example, water-wet monolithic asymmetric hollow fiber membranes can be dehydrated by the methods shown in U.S. Pat. Nos. 4,080,743, 4,080,744, 4,120,098, and EPO-219,878.

A surprising advantage provided by the present invention is its ability to produce multicomponent membranes of a wide range of compositions and configurations. In the simplest case, the invention can produce bicomponent membranes of a separating layer and a porous substrate layer. The separating layer may be dense or asymmetric. In addition, the present invention offers the advantage of forming separating materials which are otherwise impossible or very difficult to fabricate by prior art techniques into commercially useful membranes. The present invention also surprisingly enables the use of other membrane materials which have not been easily fabricated into useful commercial membranes due to solubility, solution viscosity or other rheological problems.

The fabrication processes employed to form the multicomponent membranes of the present invention depend on the major component of the membrane. For example, in manufacture of bicomponent hollow fiber membranes, selection of the spinning parameters depends on the spinnability of the substrate layer solution. This means that bicomponent membranes formed by the present invention readily can be spun essentially under the same conditions as the underlying substrate layer. However, the preferred spinning conditions are selected to optimize the morphology of the separating layer.

The multicomponent fiber membranes formed in the present invention possess the superior gas separation properties of the separating layer while maintaining the ease of fabrication of the substrate layer. This ease of fabrication allows for simplified membrane production. For example, one can start by spinning the bicomponent hollow fiber membranes under conditions already established for spinning of the substrate layer. Process modifications then may be made to provide the desired combination of properties for the multicomponent membrane.

Another surprising benefit of the present invention is the improved adhesion achieved between the layers of the membrane. A major drawback of prior art composite membranes has been delamination of the dense separating layer from the porous support under end use operating conditions. This shortcoming has been overcome, in part, in the prior art through addition of adhesion promoters between the separating and support layers. This, however, complicates fabrication of these membranes. Surprisingly, the material layers of the present multicomponent membranes do not require the use of adhesion promoters and do not delaminate under end use conditions.

The novel membranes of the invention have use in a wide variety of gas separations. For example, the membranes of the present invention are useful for the separation of oxygen from air to provide enriched oxygen to provide enhanced combustion, and for the separation of nitrogen from air to provide inerting systems; in recovery of hydrogen from hydrocarbon gas in refinery and ammonia plants; separation of carbon monoxide from hydrogen in syngas systems; for separation of nitrogen from ammonia; and separation of carbon dioxide or hydrogen sulfide from hydrocarbons.

The novel multicomponent membranes of the present invention, however, are not limited to use in gas separations. Generally, all known membrane separations can benefit from utilizing the novel membranes described herein. For example, the membranes may find use in reverse osmosis, microfiltration, ultra-filtration or other separations such as bioseparations that require affinity of certain components in a complex mixture with the membrane to effect efficient separations. Materials with the required affinity generally are not easily manufactured into useful membranes. The current invention, however, enables efficient fabrication of such membranes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight. All hollow fiber membranes are tested by flowing the feed gas along the exterior of the fiber.

EXAMPLES

Example 1

An aromatic polyamide is prepared by polycondensation of 1,4-bis(4-aminophenoxy)-2-tertbutylbenzene (122.0 g, 0.35 mole)

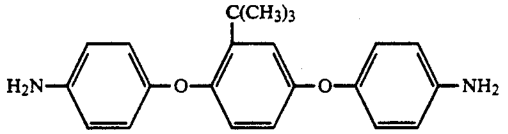

and a mixture of isophthaloyl dichloride:terephthaloyl dichloride (7:3, molar), in dimethylacetamide (DMAc) 69.63 g, 0.343 mol under an inert atmosphere. The reaction temperature is maintained at under 50° C. by control of the addition rate. To the resulting very viscous reaction solution is added lithium hydroxide (25 g) and the resulting reaction mixture is stirred overnight at room temperature. The reaction solution is precipitated in water. The resulting solid is collected and washed three times with water, washed twice with methanol, washed once with acetone and allowed to air dry overnight. The resulting light tan solid is further dried in a vacuum oven at 20 inches (0.51 m) mercury and 110° C. overnight to yield 163.5 g of polyamide product.

Films of the polyamide prepared above are cast from a 15% polymer solution (based on weight) in N,N-dimethylacetamide onto a glass plate treated with Du Pont Teflon® dry lubricant at 90° C.+2° C. with a 15-mil ($3.8\times10^{-4}$ m) ($38.4\times10^{-5}$ m) knife gap. Du Pont Teflon® dry lubricant contains a fluorocarbon telomer which reduces the adhesion of the membrane to the glass plate. After drying on the plate at 90° C.+2.° C. for 0.25 hour, the films are further dried in a vacuum oven at 20 inches (0.51 m) mercury and room temperature overnight. The films are stripped off the plate and dried in a vacuum oven at 20 inches (0.51 m) mercury and 200° C. for 48 hours. The films are tough and flexible and can be creased without cracking.

A film, prepared as above which is 1.1 mils ($2.8\times10^{-5}$ m) thick, is tested for mixed gas oxygen/nitrogen (21/79, mole) permeabilities at 483.2 psig (3332 kPa), 26.3° C. The results are reported below:

$O_2$ Productivity: 125 centiBarrers $O_2/N_2$ Selectivity: 6.6

A centiBarrer s the number of cubic centimeters of gas passed by the membrane at standard temperature and pressure multiplied by the thickness of the membrane in centimeters multiplied by $10^{-12}$ divided by the product of the permeating area of the membrane in square centimeters, the time in seconds times for permeation and the partial pressure difference across the membrane in centimeters of Hg, that is, $$\text{centiBarrer} = 10^{-12} \times \frac{\text{cm}^3\text{ (STP) cm}}{\text{cm}^2\text{ sec cmHg}}$$

A hollow-fiber composite membrane is prepared from polyether sulfone as the first substrate layer and the above polyamide as the second separating layer. A solution is prepared of 37.5% (weight) VICTREX 600P polyether sulfone (ICI corporation), 15% (weight) polyvinylpyrrolidone (average MW: 10,000, AIDRICH) and 47.5% (weight) DMAC as the solvent. A solution of 20 weight % of the polyamide, 6% (weight) lithium nitrate, 74% DMAc as the solvent is prepared. A third solution of 80% (volume) of DMAC in 20% water is prepared as the bore solution. The hollow fiber spinneret consisted of a needle with dimensions of 16 mils ($4.1\times10^{-4}$m OD and 10 mils ($2.5\times10^{-4}$ m) ID inserted in an annulus with dimensions of outer diameter of 33 mils ($8.4\times10^{-4}$ m) and inner diameter of 16 mils ($4.1\times10^{-4}$ m). The spinneret temperature is maintained at 91° C. The first substrate polymer solution is extruded at a rate of 263 cc/hr through the annulus. The bore of the fiber is maintained by means of supply of the DMAC solution into the needle at a rate of 60 cc/hr. The second separating layer I0 polymer solution is simultaneously applied at a rate of 32 cc/hr over the first substrate polymer solution using the mesa metering technique described in U.S. Pat. No.2,861,319.

The spun bicomponent fiber is passed through an air gap length of 8.0 cm at room temperature first into a water coagulation bath followed by a methanol bath. The water bath is at 18° C. and the methanol bath is at 18° C. The fiber is wound onto a drum at the rate of 43 meters per minute. The fiber is further washed with methanol and then allowed to air dry.

The resulting bicomponent fiber membrane contains about 5% by weight of the polyamide separating layer is treated as taught in U.S. Pat. No. 4,230,463 to seal any defects in the polyamide dense separating layer. Treatment involves contacting the outer surfaces of the fiber with a 5.0% (weight) SYLGARD® 184 solution in FREON® 113 (1,1,2-trichloro-1,2,2-trifluoroethane), decanting the solution and drying the fiber in a vacuum oven at 20 inches (0.51 m) mercury and room temperature overnight. SYLGARD® 184 (Dow Corning Corporation) is an elastomeric silicone material which thermally cures to a crosslinked silicone material.

The bicomponent fiber treated as above is tested for pure gas hydrogen and methane permeabilities at 200 psig (1379 kPa), 25° C. The results are reported below:

$H_2$ Productivity: 42 GPU $H_2/CH_4$ Selectivity: 315

$$GPU = 10^{-6} \times \frac{\text{cm3 (STP)}}{\text{cm}^2\text{ sec (cmHg)}}$$

As an alternative treatment to seal defects in the polyamide dense separating layer, the outer surfaces of the fiber can be contacted sequentially with a 0.1% (weight) 2,4,6-diethyltoluene-1,3-diamine (mixture of isomers, a commercial product of Ethyl Corporation) solution in FREON® 113 and a 0.1% (weight) 1,3,5-benzenetricarboxylic acid chloride solution in FREON® 113. After the final solution is decanted, the fiber is dried in a vacuum oven at 20 inches (0.51 m) mercury and room temperature overnight.

The bicomponent fiber treated as above is tested for pure gas helium and nitrogen permeabilities at 400 psig (2758 kPa), 23.0° C. The results are reported below:

He Productivity: 190 GPU $He/N_2$ Selectivity: 135

The bicomponent fiber treated as above is tested for mixed gas oxygen/nitrogen (21/79, mole) permeabilities at 120 psig (827 kPa), 28° C. The results are reported below:

$O_2$ Productivity: 26 GPU $O_2/N_2$ Selectivity: 6.6

The bicomponent fiber treated as above is tested for mixed gas carbon dioxide/methane (50/50, mole) permeabilities at 250 psig (1723 kPa), 25° C. The results are reported below:

$CO_2$ Productivity: 101 GPU $CO_2/CH_4$ Selectivity: 21

The bicomponent fiber treated as above is tested for mixed gas hydrogen/methane (50/50, mole) permeabilities at 600 psig (4137 kPa), 92° C. The results are reported below:

$H_2$ Productivity: 350 GPU $H_2/CH_4$ Selectivity: 49

The foregoing example demonstrates the invention herein. As shown above, a multicomponent, hollow fiber gas separation membrane can be prepared in essentially one step. The multicomponent hollow fiber membrane that is formed combines a gas separating layer, prepared from the separating polymer solution, on the outside surface of an anisotropic substrate membrane prepared from the substrate polymer solution. Although the separating polymer and the substrate polymer may differ compositionally, the multicomponent hollow fiber membrane does not suffer from delamination problems often encountered in the prior art membranes.

The foregoing example also illustrates another aspect of the present invention wherein, the separating polymer, although it is the minor component of the membrane, compositionally incorporates the dense gas-separating layer. This is demonstrated by comparing the relative gas separation properties of the separating polymer and the substrate polymer components versus the gas separation properties of the final multicomponent membrane. As shown above, the separating polymer component has a relatively high $O_2/N_2$ selectivity of 6.6 whereas the substrate polymer component has a substantially lower $O_2/N_2$ selectivity. Surprisingly, the $O_2/N_2$ selectivity of final multicomponent membrane more closely approximates the selectivity of the outer polymer than the selectivity of the substrate polymer layer.

The foregoing example also illustrates the variety of gas separations, such as hydrogen separations from hydrocarbons, helium separations, air separations and carbon dioxide separations from hydrocarbon streams, in which the present multicomponent membranes find utility.

Example 2

To a stirred solution of 1,4-bis(4-aminophenoxy)-biphenyl

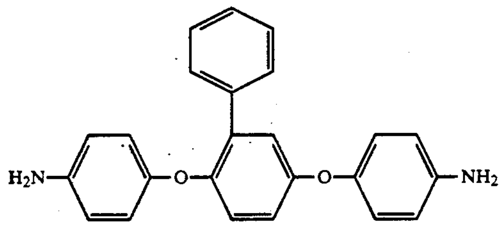

(372.8 g, 1 mol) in N,N-dimethylacetamide (2600 ml) is dropwise added melted isophthaloyl dichloride (204.0 g, 1.005 mol) under an inert atmosphere. The reaction temperature is maintained at under 52° C. by control of the addition rate. The resulting very viscous solution is stirred for 4 hours at 50° C. and then lithium hydroxide (88.14 g, 3.7 mol) is added. The resulting reaction mixture is allowed to cool to room temperature and stirred overnight. The reaction solution is diluted with N-methylpyrrolidone and precipitated in water. The resulting solid is collected and washed twice with water and twice with methanol. After air-drying overnight, the solid is dried in a vacuum oven at 20 inches (0.51 m) mercury and 120° C. for 4 hours and at 250° C. for 4 hours to yield 506.7 g product.

The polyamide prepared above is found to be soluble in dimethylsulfoxide, m-cresol, N,N-dimethylacetamide and N-methylpyrrolidone. Films of the polymer prepared above are cast from a 15% polymer solution (based on weight) in N-methylpyrrolidone onto a glass plate treated with Du Pont TEFLON® dry lubricant at 100° C.±2° C. with a 15-mil ($38.4\times10^{-5}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from a dense separating layer of the polyamide prepared above on top of a substrate of VICTREX 600P polyether sulfone (a product of ICI). A 25% VICTREX 600P polyethersulfone solution (based on weight) with 7.5% polyvinylpyrrolidone (M.W.=10,000, based on polymer weight) in N-methylpyrrolidone is cast onto a glass plate with a 15-mil ($3.8\times10^{-4}$ m) knife gap at 100° C.±3° C. After drying on the plate for 0.5 minutes at 100° C., a 20% polymer solution (based on weight) of the polyamide prepared above in a 8.5% lithium nitrate solution (weight) in N-methylpyrrolidone is cast on top of the polyethersulfone at 100° C.±3° C. with a 20-mil ($5.1\times10^{-4}$ m) knife gap. After drying at 100° C. ±3° C. for the time noted below, the membrane layers are co-coagulated in a water bath at 27° C.±1° C. Three membranes are prepared with dry times of 0.05 minute, 0.50 minute and 1.00 minute, as described above. All water-wet membranes exhibit excellent adhesion between the layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. All dry membranes exhibit excellent adhesion between the component layers. The only distinction between the layers is coloration. The top polyamide layer is light tan while the polyethersulfone substrate layer is white.

The membrane fabrication procedure employed above demonstrates the applicability of the simplified sequential casting process for the rapid assessment of the utility of materials for multicomponent membranes.

Example 3

To a stirred solution of 4,4'-[1,4-phenylenebis(1-methylethylidene)] bisaniline

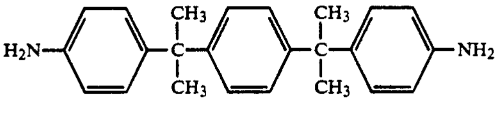

(50 g, 0.145 mol) and pyridine (27.6 g, 0.349 mol) in N-methylpyrrolidone (1 L}at room temperature under an atmosphere of nitrogen is dropwise added a melted mixture of isophthaloyl dichloride:terephthaloyl dichloride (70:30, mol, 29.51 g, 0.145 mol). The reaction temperature is controlled at <40° C. by the rate of addition. After the final addition, the reaction mixture is warmed to 50° C. for 2 hours. The viscous golden-yellow solution is precipitated in water and the resulting solid is washed four times with 3 L water and twice with 2 L methanol. The white solid is air dried and then dried in a vacuum oven at 20 inches (0.51 m) mercury and room temperature for 4 hours and at 150° C. for 4 hours to give 66.0 g product.

Differential Scanning Calorimetry (DSC) is performed on the polymer using a Du Pont Thermal Analyzer Model 990 with a Du Pont cell, baseline scope =50 in a nitrogen atmosphere at a 10.C/minute progress rate. A transition is observed with an onset at 259.6° C., midpoint at 264.7° C., and an end at 269.8° C.

Thermogravimetric Analysis (TGA) is performed on the polymer using a Du Pont Thermogravimetric Analyzer Model 99 with a Du Pont cell in an air atmosphere at 10° C./minute progress rate. A 5% weight loss is observed at 400° C. and a 40% weight loss is observed at 550° C.

Films are cast from a 15% polymer solution (weight) in N-methylpyrrolidone onto a glass plate treated with Du Pont TEFLON® dry lubricant at 85° C. with a 15 mil ($3.8\times10^{-4}$ m) knife gap. The films are dried on the plate at 85° C. for 35 minutes, cooled to room temperature and dried in a vacuum oven at 20 inches (0.51 m) mercury and room temperature overnight. The films are stripped off the plate and dried in a vacuum oven at 20 inches (0.51 m) mercury and 120° C. for 4 h.

Multicomponent membranes are prepared from the polymer prepared above on top of VICTREX 600P polyether sulfone (a product of ICI). A 25% VICTREX polyether sulfone solution (based on a weight) with 7.5% polyvinylpyrrolidone (M.W. 10,000, based on weight) in N-methylpyrrolidone is cast onto a glass plate with a 15-mil ($3.8\times10^{-4}$ m) knife gap at 100° C.

After drying on the plate for 0.5 minutes at 100° C., a 20% polymer solution (based on weight) of the polymer prepared above in a 8.5% lithium nitrate solution (weight) in N-methylpyrrolidone is cast on top of the polyethersulfone substrate at 100° C. with a 20-mil knife gap. After drying at 100° C.±3° C. for the time noted below, the membranes are coagulated in a water bath at 27° C.±1° C. Three membranes are prepared with dry times of 0.05 minute, 0.50 minute and 1.00 minute, as described above. All water-wet membranes exhibit excellent adhesion between the layers.

The resulting membranes are washed in water for 24 hours, washed in methanol for 2 hours and washed in FREON® 113 for 2 hours. The dried in a vacuum oven at 20 inches (0.51 m) mercury and room temperature overnight and at 100° C. for 4 hours. All dry membranes exhibit excellent adhesion between the component layers.

The membrane fabrication procedure shown above demonstrates the applicability of the materials described therein for gas separation membranes.

Example 4

An aromatic polyamide is prepared by polycondensation reaction of (344 grams, 1 mol) 4,4,-[1,4-phenylenebis(1-methylethylidene)] bisaniline

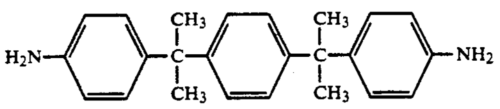

and a mixture of isophthaloyl dichloride:terephthaloyl dichloride (7:3, molar, 203.02 g, 1 mol) under an inert atmosphere in N-methylpyrrolidone. The reaction temperature is maintained at under 50° C. by control of the addition rate. The resulting very viscous, clear, tan solution is stirred for 2.5 hours after the final addition. To the stirred reaction solution is added lithium hydroxide monohydrate (92.31 g, 2.2 mol) and the resulting reaction mixture is stirred overnight at room temperature. The reaction solution is diluted with additional N-methylpyrrolidone and precipitated in water. The resulting white solid is collected, washed twice with water, washed twice with methanol and air-dried overnight. The solid is then further dried in a vacuum oven at 20 inches (0.51 m) mercury and 120° C. for 6 hours to yield 497.7 g product.

A separating polymer solution is prepared with 25% (weight) solids of the polyamide prepared above and 7.5% (weight) of lithium nitrate in 67.5 weight percent N,N-dimethylacetamide. A substrate polymer solution is prepared with 37.5% (weight) UDEL polysulfone (a product of Amoco Corporation) and 3.8% (weight) formamide in 58.7% by weight of N,N-dimethylacetamide. The first substrate solution is supplied at a rate of 140 cc/hour and the second separating layer is supplied at the rate of 16 cc/hour. The needle of the spinneret has a $2.5\times10^{-4}$ m outer diameter and $1.1\times10^{-4}$ m inner diameter, and an annulus of $5.59\times10^{-4}$ m outer diameter. A solution of 80% (weight) N,N-dimethylacetamide in water is injected into the fiber bore at a rate of 67.5 cc/hour. The spinneret temperature is 115° C. The spun bicomponent fiber is passed through an air gap length of 5.0 cm at room temperature into an aqueous coagulation bath at 180° C. The fiber is wound onto a cylindrical drum at 100 m/minute. The fiber is further washed with water and then allowed to air dry.

A fiber made in accordance with the above procedure, and that contains about 10% by weight of polyamide separation layer, is tested for mixed gas oxygen/nitrogen (21/79, mole) permeabilities at 100 psig (689 kPa), 21° C. The results are reported below:

$O_2$ Productivity: 19 GPU $O_2/N_2$ Selectivity: 5.;

Example 5

An aromatic polyimide is prepared by polycondensation of a mixture of 2,3,5,6-tetramethyl-1,4-phenylene diamine and 4,4,'-[1,4-phenylenebis(1-methylethylidene)]bisaniline with 5,5,'-[2,2,2-trifluoro-1-(trifluoromethyl)ethylidene]-1,3-isobenzofurandione

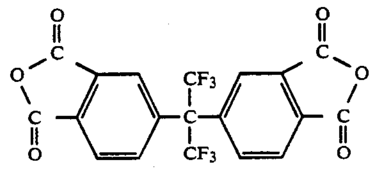

(135.86 g, 0.306 mol) under an inert atmosphere at room temperature. The reaction solution became a very viscous light yellow solution. After the clear viscous yellow solution had stirred for 1.5 hours at room temperature, a solution of acetic anhydride (122.5 g, 1.2 mol) and triethylamine (121.4 g, 1.2 mol) is added with rapid stirring at room temperature. The solution immediately turned yellow-orange with some white solid precipitating out of solution and then slowly redissolving. After stirring for 65 hours at room temperature, the resulting very dark red viscous solution is precipitated in methanol. The resulting off white solid is collected and washed with methanol and allowed to air dry. The solid is further dried in a vacuum oven at 20 inches (0.51 m) mercury and room temperature overnight, at 100° C. for 4 hours and at 200° C. for 4 hours to yield 178.5 g product.

Films of the polymer prepared above are cast from a 15% polymer solution (based on weight) in N-methylpyrrolidone onto a glass plate treated with Du Pont TEFLON® dry lubricant at 85° C.∓2° C. with a 15-mil ($3.8\times10^{-4}$ m) ($38.4\times10^{-5}$ m) knife gap. After drying on the plate at 85° C.±2° C. for 20 minutes, the films are further dried in a vacuum oven at 20 inches (0.51 m) mercury and room temperature overnight. The films are stripped off the plate and dried in a vacuum oven at 20 inches mercury and 120° C. for 4 hours. The films are tough and flexible and can be creased without cracking.

A 1.2 mil ($3.5\times10^{-5}$ m) thick film, is tested for mixed gas oxygen/nitrogen (21/79,mole) permeabilities at 502 psig ($3.46\times10^{6}$ Pa), 25° C. The results are reported below:

$O_2$ Productivity: 4000 centiBarrers $O_2/N_2$ Selectivity: 3.7

A separating polymer solution is prepared with 25% (weight) solids of the polyimide prepared as above in N,N-dimethylacetamide. A substrate polymer solution is prepared with 37.5% (weight) solids VICTREX 600P polyether sulfone and 15.0% polyvinylpyrrolidone (M.W.=10,000) in N,N-dimethylacetamide. Hollow fiber membranes are prepared by extruding the above polymer solutions through a hollow fiber spinneret as described in Example 1. The separating polymer solution is extruded at a rate of 48 cc/hour and the substrate solution is extruded at a rate of 140 cc/hour. A bore fluid of a solution of 80% (volume) N,N-dimethylacetamide in water is injected into the fiber bore at a rate of 72 cc/hour. The spinneret temperature is 60° C. The spun bicomponent fiber is passed through an air gap length of 8.0 cm at room temperature into an aqueous coagulation bath at 23° C. The fiber is wound up on a drum at the rate of 34 meters per minute. The fiber is further washed in water and then allowed to air dry.

The fiber membrane is tested for mixed gas oxygen/nitrogen (21/79, mole) permeabilities at 100 psig (689 kPa), 25° C. The results are reported below:

$O_2$ Productivity: 43 GPU
$O_2/N_2$ Selectivity: 3.5

Example 6

A bicomponent fiber membrane is prepared as in Example 5 except the aqueous coagulation bath temperature is 36° C. The fiber is then treated as in Example 5.

The fiber membrane is tested for mixed gas oxygen/nitrogen (21/79, mole) permeabilities at 100 psig (689 kPa), 25° C. The results are reported below:

$O_2$ Productivity: 40 GPU
$O_2/N_2$ Selectivity: 3.0

Example 7

A bicomponent fiber membrane is prepared as in Example 5 except the aqueous coagulation bath temperature is 15° C. and the fiber is wound up on the drum at a rate of 35 meters per minute. The fiber is then treated as in Example 5.

The fiber is tested for mixed gas oxygen/nitrogen (21/79, mole) permeabilities at 100 psig (689 kPa), 25° C. The results are reported below:

$O_2$ Productivity: 43 GPU
$O_2/N_2$ Selectivity: 3.5

Example 8

A bicomponent fiber membrane is prepared as in Example 5 except the separating polymer solution is extruded at the rate of 24 cc/hour and the bore fluid is injected at a rate of 68 cc/hour. Further, the water-wet fiber is washed for 2 hours in methanol and then washed in pentane for 2 hours. The fiber then is allowed to air dry.

The fiber is tested for mixed gas oxygen/nitrogen (21/79, mole) permeabilities at 100 psig (689 kPa), 25° C. The results are reported below:

$O_2$ Productivity: 260 GPU
$O_2/N_2$ Selectivity: 2.8

Example 9

A bicomponent fiber membrane is prepared as in Example 5 except for the following changes. The separating polymer solution is extruded at a rate of 24 cc/hour and the bore fluid is injected at a rate of 68 cc/hour. The aqueous coagulation bath temperature is 14° C. Further, the water-wet fiber is washed for 2 hours in methanol and then washed for 2 hours in pentane. The fiber is then allowed to air dry.

The fiber is tested for mixed gas oxygen/nitrogen (21/79, mole) permeabilities at 100 psig (689 kPa), 25° C. The results are reported below:

$O_2$ Productivity: 200 GPU
$O_2/N_2$ Selectivity: 3.0

Example 10

The same separating polymer solution, substrate polymer solution, and bore fluid compositions are used as described in Example 5. Further, the same spinneret design is used as in Example 5. The separating polymer solution is extruded at a rate of 32 cc/hour and the substrate solution is extruded at a rate of 263 cc/hour. The bore fluid is injected into the fiber bore at a rate of 80 cc/hour. The spinneret temperature is 60° C. The spun bicomponent fiber is passed through an air gap length of 5.0 cm at room temperature into an aqueous coagulation bath at 13° C. The fiber is wound up on a drum at the rate of 50 meters per minute. The water-wet fiber is consecutively washed in methanol and pentane and then allowed to air dry.

The fiber is tested for mixed gas oxygen/nitrogen (21/79, mole) permeabilities at 100 psig (689 kPa), 25° C. The results are reported below:

$O_2$ Productivity: 330 GPU
$O_2/N_2$ Selectivity: 2.5

Example 11

Bicomponent fiber membranes are prepared as in Example 10 except the separating polymer solution is extruded at a rate of 15 cc/hour and the aqueous coagulation bath temperature is 6° C. The fiber is treated as in Example 9.

The fiber is tested for mixed gas oxygen/nitrogen (21/79, mole) permeabilities at 100 psig (689 kPa), 25° C. The results are reported below:

$O_2$ Productivity: 120 GPU
$O_2/N_2$ Selectivity: 3.2

Example 12

The same separating polymer solution, substrate polymer solution, and bore fluid compositions are used as described in Example 5. Further, the same spinneret design is used as in Example 5. The separating polymer solution is extruded at a rate of 40 cc/hour and the substrate solution is extruded at a rate of 350 cc/hour. The bore fluid is injected into the fiber bore at a rate of 120 cc/hour. The spinneret temperature is 90 ° C. The spun bicomponent fiber is passed through an air gap length of 8.0 cm at room temperature into a quench bath composed of 20% (weight) N,N-dimethylacetamide in water at 10° C. The fiber is wound up on a drum at the rate of 56 meters per minute. The water-wet fiber is consecutively washed in methanol and pentane and then allowed to air dry.

The fiber is tested for mixed gas oxygen/nitrogen (21/79, mole) permeabilities at 100 psig (689 kPa), 25° C. The results are reported below:

$O_2$ Productivity: 215 GPU
$O_2/N_2$ Selectivity: 3.0

Example 13

Bicomponent fiber membranes are prepared as in Example 12 except the separating polymer solution is extruded at a rate of 20 cc/hour. The fiber is then treated as in Example 12.

The fiber is tested for mixed gas oxygen/nitrogen (21/79, mole) permeabilities at 100 psig (689 kPa), 25° C. The results are reported below:

$O_2$ Productivity: 140 GPU
$O_2$ Selectivity: 3.4
and
$O_2$ Productivity: 170 GPU $O_2/N_2$ Selectivity: 3.3

Example 14

A polyimide is prepared through the polycondensation of 2,4,6-trimethyl-1,3-phenylene diamine with 5,5,'-[2,2,2-trifluoro-1-(trifluoromethyl) ethylidene]-1,3-isobenzofurandione. A process for the preparation of this polyimide is taught in U.S. Pat. No. 4,705,540 and is incorporated herein by reference. Dense film gas permeation properties of the polyimide are also disclosed therein.

A polyamide is prepared through the polycondensation of 2,4,6-diethyltoluene-1,3-diamine (a mixture of isomers, a commercial product of the Ethyl Corporation) and a 7:3 molar mixture of isophthaloyl dichloride: terephthaloyl dichloride. The process for the preparation of this polyamide is similar to such processes as described in European Patent Number 219,878.

A separating polymer solution is prepared with 24% (weight) solids of the polyimide prepared as above and 7.2% (weight) lithium nitrate in N,N-dimethylacetamide. A substrate polymer solution is prepared with 27% (weight) solids of the polyamide prepared as above and 8.1% (weight) lithium nitrate in N,N-dimethylacetamide. The above polymer solutions are extruded through a hollow fiber spinneret with fiber channel dimensions as set forth in Example 1. The separating polymer solution is extruded at a rate of 22 cc/hour and the substrate solution is extruded at a rate of 100 cc/hour. A solution of 70% (volume) N,N-dimethylacetamide in water is injected into the fiber bore at a rate of 40 cc/hour. The spinneret temperature is 80° C. The spun bicomponent fiber is passed through an air gap length of 6.0 cm at room temperature into a coagulation bath composed of a 1:1 water:methanol (weight) solution at 20° C. The fiber is wound up on a drum at the rate of 34 meters per minute. The fiber is further washed in methanol and then allowed to air dry.

The fiber is tested for mixed gas oxygen/nitrogen (21/79, mole) permeabilities at 100 psig (689 kPa), 26° C. The results are reported below:

$O_2$ Productivity: 44 GPU $O_2/N_2$ Selectivity: 2.5

Example 15

A bicomponent fiber membrane is prepared as in Example 14 with the following changes. The separating polymer solution is extruded at a rate of 12 cc/hour. The spinneret temperature is 75° C. The spun bicomponent fiber is passed through an air gap length of 7.0 cm at room temperature into the previous coagulation bath and wound onto a drum at the rate of 20 meters per minute. The fiber is treated as before in Example 14.

The fiber is tested for mixed gas oxygen/nitrogen (21/79, mole) permeabilities at 100 psig (689 kPa), 26° C. The results are reported below:

$O_2$ Productivity: 68 GPU $O_2/N_2$ Selectivity: 2.4

Example 16

A bicomponent fiber membrane is prepared as in Example 14 with the following changes. The separating polymer solution is extruded at a rate of 12 cc/hour. The spinneret temperature is 71° C. The spun bicomponent fiber is passed through an air gap length of 8.0 cm at room temperature into an aqueous coagulation bath at 25° C. The fiber is wound up on a drum at the rate of 30 meters per minute. The fiber is further washed with water and then allowed to air dry.

The bicomponent fiber is tested for mixed gas oxygen/nitrogen (21/79, mole) permeabilities at 100 psig (689 kPa), 25° C. The results are reported below:

$O_2$ Productivity: 25 GPU $O_2/N_2$ Selectivity: 4.2

Example 17

Multicomponent membranes are prepared from the polyimide prepared in Example 14 on top of VICTREX 600P polyethersulfone (a product of ICI). A 25% VICTREX 600P polyether sulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 110° C. After drying on the plate for 0.5 minutes at 100° C., a 24% polymer solution (based on weight) of the polyimide prepared in Example 14 in N-methylpyrrolidone is cast on top of the above film at 100° C. with a 20-mil ($5.1\times10^{-5}$ m) gap. After drying at 100°±3° C. for the time noted below, the membranes are coagulated in a water bath at 27° C.±1° C. Three membranes are prepared with dry times of 0.05 minute, 0.50 minute, and 1.00 minute, as described above The water-wet membranes exhibit adhesion between the layers which ranges from poor to good.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. All dry membranes exhibit poor to moderate adhesion between the component layers. The dry membranes curled slightly and the layers can be pulled apart.

The membrane prepared above which had a dry time of 1.00 minute is tested for pure gas helium and nitrogen permeabilities at 100 psig (689 kPa), 24° C. The results are reported below:

He Productivity: 150 GPU

He/N2 Selectivity: 4.6

This example demonstrates the importance in matching of the properties of the materials employed to form the present multicomponent membranes. The poor to moderate adhesion found in this example is possibly due to the greater hydrophilicity of the polyimide material which forms the separating layer over the polyether sulfone substrate material. Greater adhesion of this polyimide separating material is found when the substrate material is matched more closely as in Examples 14, 15, and 16.

Examples 18–21

Bicomponent membranes are prepared from ULTEM® 1000 polyetherimide (a commercial product of G. E. Corporation) on top of VICTREX 600P polyethersulfone. ULTEM® 1000 is believed to have the structure shown below:

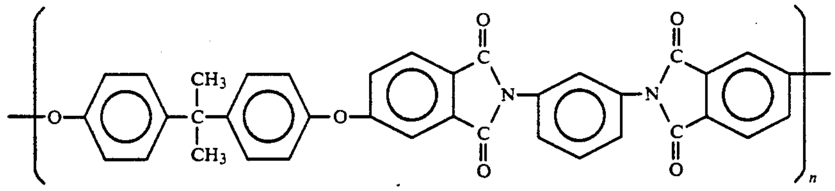

A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 100° C. for 0.5 minutes, a 22% ULTEM 1000 polyetherimide solution (weight) in N-methylpyrrolidone is cast on top of the above nascent film at 100° C. with a 20-mil ($5.1\times10^{-4}$ m) knife gap. After drying at 100° C. for the time noted in Table 1, the membranes are coagulated in a water bath at 19.C. The water-wet membranes exhibit good adhesion between the layers.

TABLE 1

| Example | Dry Time (min) | Treated Membranes PHe (GPU) | PHe/PN$_2$ |
|---|---|---|---|
| 18 | 0.5 | 93 | 36 |
| 19 | 1.0 | 90 | 113 |
| 20 | 2.0 | 22 | 55 |
| 21 | 3.0 | 63 | 10 |

The resulting bicomponent membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The dry bicomponent membranes exhibit good adhesion between the layers.

The bicomponent membranes prepared as above as treated as taught in U.S. Pat. No. 4,230,463 to seal defects in the polyetherimide dense separating layer. This involves contacting the membrane with a 5.0% (weight) SYLGARD 184 (available from Dow Corning Corp.) solution in cyclohexane, removing the membrane from the solution and drying the membrane in a vacuum oven (20 inches mercury) at 55° C.±5° C. overnight.

The bicomponent membranes, treated as above, are tested for pure gas helium and nitrogen permeabilities at 100 psig (689 kPa), 24° C. The results are reported in Table 1.

Example 22

Bicomponent membranes are prepared from ULTEM 1000 polyetherimide (a commercial product of G. E. Corporation) on top of VICTREX 600P polyethersulfone. A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 100° C. After drying on the plate at 100° C. for 0.5 minutes, a 24% ULTEM 1000 polyetherimide (weight) solution in N-methylpyrrolidone is cast on top of the above film at 100° C. with a 20-mil ($5.1\times10^{-4}$ m) knife gap. After drying at 100° C. for 0.5 minutes, the membranes are coagulated in a water bath at 13° C. The water wet membranes exhibit good adhesion between the layers.

The resulting bicomponent membranes are washed in water for 24 hours, washed in methanol for 2 hours, and washed in FREON® 113 for 2 hours. The membranes are dried in a vacuum oven at 20 inches (0.51 m) mercury and room temperature overnight and at 100° C. for 4 hours. The dry bicomponent membranes exhibit good adhesion between the layers.

The bicomponent membranes prepared as above are treated as taught in U.S. Pat. No. 4,230,463 to seal defects in the polyetherimide dense separating layer. This involves contacting the membrane with a 5.0% (weight) SYLGARD 184 solution in cyclohexane, removing the membrane from the solution and drying the membrane in a vacuum oven at 20 inches (0.51 m) mercury and 55° C. ±5° C. overnight.

A bicomponent membrane treated as above is tested for pure gas helium and nitrogen permeabilities at 100 psig (689 kPa), 24° C. The results are reported below:

He Productivity: 117 GPU

He/$N_2$ Selectivity: 195

This bicomponent membrane is further tested for mixed gas oxygen/ nitrogen (21/79, mole) permeabilities at 100 psig (689 kPa), 23° C. The results are reported below:

$O_2$ Productivity: 7 GPU $O_2$/$N_2$ Selectivity: 4.5

Example 23

To a stirred solution of bis[4-(4-aminophenoxy)-phenyl]sulfone

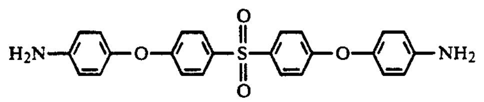

(49.71 g, 0.115 mol) in pyridine (70 ml) and N,N-dimethylacetamide (350 ml) is dropwise added melted isophthaloyl dichloride (23.26 g, 0.115 mol) under an inert atmosphere. The reaction temperature is maintained at under 50° C. by control of the addition rate. The resulting reaction solution is stirred for 3 hours after the final addition and then lithium hydroxide monohydrate (10.0 g, 0.24 mol) is added. The resulting reaction mixture is stirred overnight at room temperature and then precipitated in methanol. The resulting solid is soaked in water overnight, washed with water, washed twice with methanol, and allowed to air dry overnight. The solid is further dried in a vacuum oven at 20 inches (0.51 m) mercury and 120° C. for 6 hours to yield 67.0 g of polymer product.

Multicomponent membranes are prepared from the polymer prepared above on top of VICTREX 600P polyethersulfone (a product of ICI). A 25% VICTREX 600P polyethersulfone solution (based on weight) with 7.5% polyvinyl pyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 24% polymer solution (based on weight) of the polymer prepared above in a 8.5% lithium nitrate solution (weight) in N-methylpyrrolidone is cast on top of the above film at 100° C. with a 20-mil knife gap. After drying at 100° C. for 0.05 minutes, the membranes are coagulated in a water bath at 13° C. The water-wet membranes exhibit good adhesion between the layers.

The resulting bicomponent membranes are washed in water for 24 hours, washed in methanol for 2 hours and washed in FREON ® 113 for 2 hours. The membranes are dried in a vacuum oven at 20 inches (0.51 m) mercury and room temperature overnight and at 100° C. for 4 hours. The dry bicomponent membranes exhibit good adhesion between the layers.

The bicomponent membranes prepared as above are treated as taught in U.S. Pat. No. 4,230,463 to seal defects in the polyamide dense separating layer. This involves contacting the membrane with 5.0% (weight) SYLGARD 184 solution in cyclohexane, removing the membrane from the solution and drying the membrane in a vacuum oven at 20 inches (0.51 m) mercury and 55° C.±5° C. overnight.

A membrane treated as above is tested for pure gas helium and nitrogen permeabilities at 100 psig (689 kPa), 24° C. The results are reported below:

He Productivity: 77 GPU $He/N_2$ Selectivity: 64

Example 24

To a stirred solution of 2,2-bis[4-(4-aminophenoxy)-phenyl]propane

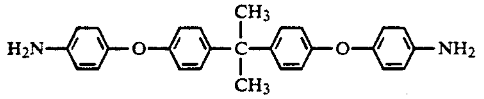

dropwise added a melted mixture of isophthaloyl dichloride:terephthaloyl dichloride (7:3, molar, 20.3 g, 0.10 mol) under an inert atmosphere. The reaction temperature is maintained at under 50° C. by control of the addition rate. After the very viscous, golden reaction solution had stirred for 4 hours, lithium hydroxide monohydrate (10.49 g, 0.25 mol) is added and the resulting reaction mixture is allowed to stir overnight at room temperature. The reaction solution is diluted with additional N-methylpyrrolidone and precipitated n water. The resulting solid is collected and washed 3 times with water, washed 3 times with methanol and allowed to air dry overnight. The solid is further dried in a vacuum oven at 20 inches (0.51 m) mercury and 120° C. for 6 hours to yield 50.9 g of polymer product. The polymer prepared above is found to be soluble in m-cresol, dimethylsulfoxide, N,N-dimethylacetamide and N-methylpyrrolidone.

Films of the polymer prepared above are cast from 15% polymer solution (based on weight) in N-methylpyrrolidone onto a glass plate treated with Du Pont TEFLON ® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinyl pyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 20% polymer solution (based on weight) of the polymer prepared above with 6.8% lithium nitrate in N-methylpyrrolidone is cast on top of the above film at 100° C. with a 20-mil ($5.1\times10^{-4}$ m) knife gap. After drying at 100° C. ±3° C. for 0.50 minute, the membranes are coagulated in a water bath at 27° C.±1° C. All water-wet membranes exhibit very good adhesion between the layers.

The resulting bicomponent membranes are washed in water for 24 hours, washed in methanol for 2 hours and washed in FREON ® 113 for 2 hours. The membranes are dried in a vacuum oven at 20 inches (0.51 m) mercury and room temperature overnight and at 100° C. for 4 hours. The dry bicomponent membranes exhibit good adhesion between the layers.

The procedure of this example demonstrates the applicability of the materials described therein for fabrication into gas separation membranes.

Example 25

To a stirred solution of 4,4,'-[1,3-phenylenebis(1-methylethylidene)]bisaniline

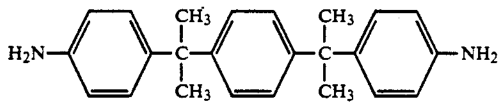

(50.0 g, 0.145 mol) in pyridine (27.6 g, 0.35 mol) and N-methylpyrrolidone (600 ml) is dropwise added a melted mixture of isophthaloyl dichloride:terephthaloyl dichloride (7:3, molar, 29.51 g, 0.145 mol) under an inert atmosphere. The reaction temperature is maintained under 50° C. by control of the addition rate. The resulting viscous solution is stirred at 53° C.±4° C. for 1 hour and then precipitated in water. The resulting white solid is collected and washed four times with water, washed twice with methanol, and allowed to air dry overnight. The solid is further dried in a vacuum oven at 20 inches (0.51 m) mercury and room temperature overnight and at 150° C. for 4 hours to yield 66.9 g of polymer product.

Films of the polymer prepared above are cast from 10% polymer solution (based on weight) in N-methylpyrrolidone onto a glass plate treated with Du Pont TEFLON ® dry lubricant at 85° C.±2° C. with a 15-mil ($3.8\times10^{-4}$ m) knife gap. After drying on the plate at 85° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Films are cast from a 15% polymer solution (weight) in N-methylpyrrolidone onto a glass plate treated with Du Pont TEFLON ® dry lubricant at 80° C. with a 15-mil ($3.8\times10^{-4}$ m) knife gap. The films are dried on the plate at 80° C. for 30 minutes, cooled to room temperature and dried in a vacuum oven at 20 inches (0.51 m) mercury and room temperature overnight. The films are stripped off the plate and dried in a vacuum oven at 20 inches (0.51 m) mercury and 120° C. for 4 hours.

Multicomponent membranes are prepared from the polymer prepared above on top of VICTREX 600P polyethersulfone (a product of ICI). A 25% VICTREX 600P polyethersulfone solution (based on weight) with 7.5% polyvinyl pyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 20% polymer solution (based on weight) of the polymer prepared above with 6.8% lithium nitrate in N-methylpyrrolidone is cast on top of the above film at 100° C. with a 20-mil ($5.1\times10^{-4}$ m) knife gap. After drying at 100° C. ±3° C. for the times noted below, the membranes are coagulated in a water bath at 15° C.±1° C. Two membranes are prepared with dry times of 0.05 minute and 1.00 minute, as described above. All water-wet membranes exhibit excellent adhesion between the layers.

The resulting bicomponent membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The dry bicomponent membranes exhibit good adhesion between the layers.

The procedure employed in this example demonstrates the applicability of the materials described therein for fabrication into gas separation membranes.

Example 26

To a stirred solution of 4,4,'-methylene-bis(3-chloro-2,6-diethylaniline) (37.94 g, 0.10 mol) and 1,4-bis(4-aminophenoxy)biphenyl (37.28 g, 0.10 mol) in N-methylpyrrolidone (350 ml) is dropwise added a melted mixture of isophthaloyl dichloride:terephthaloyl dichloride (7:3, molar, 40.69 g, 0.20 mol) under an inert atmosphere. The reaction temperature is maintained at under 50° C. by control of the addition rate. The resulting very viscous light brown solution is stirred for 4.5 hours and then lithium hydroxide monohydrate (21 g, 0.5 mol) is added. The resulting reaction mixture is stirred at room temperature overnight. After dilution with additional N-methylpyrrolidone, the reaction solution is precipitated in water. The resulting solid is collected and soaked in water overnight, washed three times with water, washed three times with methanol and allowed to air dry overnight. The polymer is further dried in a vacuum oven at 20 inches (0.51 m) mercury and 120° C. for 6 hours to yield 106.2 g product. The polymer prepared above is soluble in dimethyl sulfoxide, m-cresol, N,N-dimethylacetamide and N-methylpyrrolidone.

Films of the polymer prepared above are cast from 15% polymer solution (based on weight) in N-methylpyrrolidone onto a glass plate treated with Du Pont TEFLON® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinyl pyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 20% polymer solution (based on weight) of the polymer prepared above with 6.8% (weight, based on polymer) lithium nitrate in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 23° C.±2° C. Three membranes are prepared with dry times of 0.05 minute, 0.50 minute and 1.00 minute, as described above. All water-wet membranes exhibit excellent adhesion between the layers.

The resulting bicomponent membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The dry bicomponent membranes exhibit good adhesion between the layers.

The procedure of this example demonstrates the applicability of the materials described therein for fabrication into gas separation membranes.

Example 27

To a stirred solution of 1,4-bis(4-aminophenoxy)-biphenyl (186.4 g, 0.50 mol) and 4,4'-phenylenebis(1-methylethylidene)]bisaniline (172.0 g, 0.50 mol) in N-methylpyrrolidone (2,600 ml) is dropwise added a melted mixture of isophthaloyl dichloride:terephthaloyl dichloride (7:3, molar, 203.0 g, 1.0 mol) under an inert atmosphere. The reaction temperature is maintained at under 50° C. by control of the addition rate. The resulting very viscous solution is stirred 2.0 hours at 42° C. and then lithium hydroxide monohydrate (92.3 g, 2.2 mol) is added. The resulting reaction mixture is stirred at room temperature overnight and then precipitated in water. The resulting solid is collected, washed twice with water, washed twice with methanol and air-dried overnight. The solid is further dried in a vacuum oven at 20 inches (0.51 m) mercury and 120° C. for 7 hours to yield 502.6 g product. The polymer prepared above is soluble in dimethylsulfoxide, m-cresol, N,N-dimethyl acetamide, and N-methylpyrrolidone.

Films of the polymer prepared above are cast from 15% polymer solution (based on weight) in N-methylpyrrolidone onto a glass plate treated with Du Pont TEFLON® dry lubricant at 100° C.±2° C. with a 15-mil ($3.8\times10^{-4}$ m) ($38.4\times10^{-5}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 20% polymer solution (based on weight) of the polymer prepared above in a 8.5% lithium nitrate solution (weight) in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 27° C.±1° C. Three membranes are prepared with dry times of 0.05 minute, 0.50 minute, and 1.00 minute, as described above. All water-wet membranes exhibit good adhesion between the layers.

The resulting membranes are washed in water for 24 hours, washed in methanol for 2 hours and washed in FREON ® 113 for 2 hours. The membranes are dried in a vacuum oven at 20 inches (0.51 m) mercury and room temperature overnight and at 100° C. for 4 hours. All dry membranes exhibit excellent adhesion between the layers.

The procedure of this example demonstrates the applicability of the materials described therein for fabrication into gas separation membranes.

Example 28

To a stirred solution of 1,4-bis(4-aminophenoxy)-biphenyl (186.4 g, 0.50 mol) and (4-aminophenyl) ether (100.12 g, 0.50 mol) in N,N-dimethylacetamide (2,600 ml) is dropwise added a melted mixture of isophthaloyl dichloride:terephthaloyl dichloride (7:3, molar, 203.02 g, 1.0 mol) under an inert atmosphere. The reaction temperature is maintained at under 50° C. by control of the addition rate. The resulting very viscous solution is stirred 1.75 hours at 50° C. and then lithium hydroxide (88.14, 3.7 mol) is added. The resulting reaction mixture is stirred at room temperature overnight and then precipitated in water. The resulting solid is collected, washed twice with water, washed twice with methanol and air-dried overnight. The solid is further dried in a vacuum oven at 20 inches (0.51 m) mercury and 120° C. for 5 hours to yield 424.2 g of polymer product. The polymer prepared above is soluble in dimethyl sulfoxide, N,N-dimethylacetamide and N-methylpyrrolidone.

Films of the polymer prepared above are cast from 10% polymer solution (based on weight) in N-methylpyrrolidone onto a glass plate treated with Du Pont TEFLON ® dry lubricant at 100° C.±2° C. with a 20-mil ($5.1\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 20% polymer solution (based on weight) of the polymer prepared above with 6.8% (weight) lithium nitrate in N-methylpyrrolidone is cast on top of the above film at 100° C. with a 20-mil ($5.1\times10^{-4}$ m) knife gap. After drying at 100° C.±3° C. for the times noted below the membranes are coagulated in a water bath at 26° C.±1° C. Three membranes are prepared with dry times of 0.05 minute, 0.50 minute, and 1.00 minute, as described above. All water-wet membranes exhibit excellent adhesion between the layers.

The resulting bicomponent membranes are washed in water for 24 hours, washed in methanol for 2 hours and washed in FREON ® 113 for 2 hours. The membranes are dried in a vacuum oven at 20 inches (0.51 m) mercury and room temperature overnight and at 100° C. for 4 hours. The dry bicomponent membranes exhibit good adhesion between the layers.

The procedure of this example demonstrates the applicability of the materials described therein for fabrication into such gas separation membranes.

Example 29

To a stirred solution of 2,2-bis[4-(4-aminophenoxy)-phenyl]propane (41.0 g, 0.10 mol) in N-methylpyrrolidone (350 ml) is added 5,5'-[2,2,2-trifluoro-1-(trifluoromethyl)ethylidene]-bis-1,3-isobenzofurandione (44.84 g, 0.101 mol) under an inert atmosphere at room temperature. The reaction became very viscous and is allowed to stir overnight at room temperature. A solution of acetic anhydride (40.84 g, 0.40 mol) and triethylamine (40.48 g, 0.40 mol) in N-methylpyrrolidone (200 ml) is added with rapid stirring at room temperature. After stirring over the weekend (48 hours) at room temperature, the very viscous reaction solution is diluted with additional N-methylpyrrolidone and precipitated in water. The resulting solid is collected and washed twice with water, washed twice with methanol and allowed to air dry overnight. The solid is further dried in a vacuum oven at 20 inches (0.51 m) mercury and 145° C. for 4 hours and at 225° C. for 3 hours to yield 88.6 g product. The polymer prepared above is soluble in dichloromethane, m-cresol, dimethylsulfoxide, N,N-dimethylacetamide and N-methylpyrrolidone.

Films of the polymer prepared above are cast from 15% polymer solution (based on weight) in N-methylpyrrolidone onto a glass plate treated with Du Pont TEFLON ® dry lubricant at 100° C.±2° C. with a 15-mil ($3.8\times10^{-4}$ m) ($38.4\times10^{-5}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 97.5° C.±3° C. After drying on the plate for 0.5 minutes at 97.5° C.±3° C., a 22% polymer solution (based on weight) of the polymer prepared above in N-methylpyrrolidone is cast on top of the above film at 97.5° C.±3° C. with a 20-mil knife gap. After drying at 97.5° C.±3° C. for the times noted below, the membranes are coagulated in a water bath at 27° C.±1° C. Three membranes are prepared with dry times of 0.05 minute, 0.50 minute, and 1.00 minute, as described above. All water-wet membranes exhibit excellent adhesion between the layers.

The resulting membranes are washed in water for 24 hours, washed in methanol for 2 hours and washed in FREON ® 113 for 2 hours. The membranes are dried in a vacuum oven at 20 inches (0.51 m) mercury and room temperature overnight and at 100.C for 4 hours. All dry membranes exhibit excellent adhesion between the layers.

The bicomponent membrane which is dried 0.5 minutes is tested for pure gas helium and nitrogen permeabilities at 100 psig (689 kPa), 24° C. The results are reported below:

He Productivity: 168 GPU $He/N_2$ Selectivity: 17.3

The membrane fabrication procedure of this example demonstrates the applicability of the materials described therein for gas separation membranes.

Examples 30–37

To a stirred solution of 2,7-bis(4-aminophenoxy)-naphthalene (25.00 g, 0.073 mol) in N-methylpyrrolidone (200 ml) is added 5,5'-[2,2,2-trifluoro-1(trifluoromethyl)ethylidene]-bis-1,3-isobenzofurandione (32.78 g, 0.74 mol) under an inert atmosphere at room temperature. The very viscous golden-brown reaction solution is stirred overnight at room temperature. A solution of acetic anhydride (29.85 g, 0.29 mol) and triethylamine (29.58 g, 0.29 mol) is added with rapid stirring at room temperature. After stirring for 2 hours at room temperature, the very viscous reaction solution is diluted with additional N-methylpyrrolidone and precipitated in water. The resulting solid is collected and washed three times with water, washed twice with methanol and allowed to air dry overnight. The solid is further dried in a vacuum oven (20 inches mercury) at 120° C. for 4 hours and at 250° C. for 4 hours. The polymer prepared above is soluble in dichloromethane, dimethylsulfoxide, meta-cresol, N,N-dimethylacetamide, and N-methylpyrrolidone.

Films of the polymer prepared above are cast from a 15% polymer solution (based on weight) in N-methylpyrrolidone onto a glass plate treated with Du Pont TEFLON ® dry lubricant at 100° C.±2° C. with a 15-mil ($3.8\times10^{-4}$ m) knife gap. After drying on the plate at 100° C.±2° C, for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

A film, prepared as above which is 1.30 mils ($3.3\times10^{-5}$ m) thick, is tested for mixed gas oxygen/nitrogen (21/79, mole) permeabilities at 491.2 psig ($3.39\times10^{6}$ Pa), 22.8° C. The results are reported below:

$O_2$ Productivity: 140 centiBarrers $O_2/N_2$ Selectivity: 5.5

Multicomponent membranes are prepared from the polymer prepared above on top of VICTREX 600P polyethersulfone (a product of ICI). A 25% VICTREX 600P polyvinylpyrrolidone (based on weight) in 7.5% polyvinylpyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 24% polymer solution (based on weight) of the polymer prepared above in N-methylpyrrolidone is cast on top of the above film at 100° C. with a 20-mil ($5.1\times10^{-4}$ m) knife gap. After drying at 100° C. for the times noted in Table 2, the membranes are coagulated in a water bath at 25° C.±1° C. All membranes exhibit excellent adhesion between the layers.

The resulting membranes are washed in water for 24 hours, washed in methanol for 2 hours and washed in FREON ® 113 for 2 hours. The membranes are dried in a vacuum oven at 20 inches (0.51 m) mercury and room temperature overnight and at 100° C. for 4 hours. The membranes exhibit excellent adhesion between layers.

The membranes are tested for pure gas helium and nitrogen permeabilities at 100 psig (689kPa), 24° C. The results are reported in Table 2.

TABLE 2

| Example | Dry Time (min) | PHe (GPU) | PHe/PN2 |
|---|---|---|---|
| 30 | 0.05 | 570 | 3.2 |
| 31 | 0.50 | 580 | 7.6 |
| 32 | 1.00 | 630 | 8.5 |
| 33 | 2.00 | 220 | 6.4 |
| 34 | 3.00 | 100 | 7.3 |
| 35 | 4.00 | 160 | 10.3 |
| 36 | 4.50 | 50 | 11.7 |
| 37 | 5.00 | 30 | 35.3 |

The bicomponent membranes prepared as above are treated as taught in U.S. Pat. No. 4,230,463 to seal defects in the polyimide dense separating layer. This involves contacting the membrane with a 5.0% (weight) SYLGARD 184 solution in cyclohexane, removing the membrane from the solution and drying the membrane in a vacuum oven (20 inches mercury at 55° C.±5° C. overnight.

The treated bicomponent membrane of Example 31 is tested for pure gas helium and nitrogen permeabilities at 100 psig (689 kPa), 24° C. The treated bicomponent membrane of Example 32 is tested for mixed gas oxygen/nitrogen (21/79, mole) permeabilities at 100 psig (689 kPa), 23° C. The treated bicomponent membrane of Example 35 is tested for pure gas carbon dioxide permeability at 100 psig (689 kPa), 25° C. The results are reported in Table 3.

TABLE 3

| Example | PHe (GPU) | PHe/PN2 | PO2 (GPU) | PO2/PN2 | PCO2 (GPU) | PCO2/PN2 |
|---|---|---|---|---|---|---|
| 31 | 86 | 22 | | | | |
| 32 | 139 | 34 | 19.4 | 4.6 | | |
| 35 | 81 | 51 | | | 24 | 15 |

The procedure of this example demonstrates the applicability of the materials described therein for fabrication into gas separation membranes.

Example 38

To a stirred solution of 4,4'-methylene-bis(2,6-diisopropyl aniline) (55.0 g, 0.15 mol) and 4,4,'-[1,4-phenylenebis(1-methylethylidene)]bisaniline (17.2 g, 0.05 mol) in N-methylpyrrolidone (400 ml) is added 3,3',4,4'-benzophenonetetracarboxylic dianhydride (65.1 g, 0.202 mol) under an inert atmosphere at room temperature. The dark, viscous solution is stirred overnight at room temperature. A solution of acetic anhydride (75.5 ml, 0.80 mol) and triethylamine (111.5 ml, 0.80 mol) is added with rapid stirring at room temperature. After stirring for 7 hours at room temperature, the viscous, orange reaction solution is precipitated in water. The resulting solid is washed three times with water and two times with methanol. The polymer is air-dried overnight and then dried in a vacuum oven at 20 inches (0.51 m) mercury and 120° C. for 4 hours and at 250° C. for 4 hours to yield 134.8 g of polymer product.

Films of the polymer prepared above are cast from a 15% polymer solution (based on weight) in N-methylpyrrolidone onto a glass plate treated with Du Pont TEFLON ® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinyl pyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 22% polymer solution (based on weight) of the polymer prepared above in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 25° C.±1° C. Three membranes are prepared with dry times of 0.05 minute 0.50 minute, and 1.00 minute, as described above. All membranes exhibit good adhesion between the layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight at 100° C. for 4 hours. All dry membranes exhibit good adhesion between the component layers.

The procedure of this example demonstrates the applicability of the materials described therein for fabrication into gas separation membranes.

Example 39

A stirred solution of 4,4'-[1,4-phenylenebis(1-methylethylidene)]bisaniline (68 8 g, 0.20 mol), 5,5'-[2,2,2-trifluoro-1-(trifluoromethyl) ethylidene]-bis-1,3-isobenzofurandione (97.2 g, 0.2025 mol) and N-methylpyrrolidone (900 ml) is slowly heated to reflux under an inert atmosphere while collecting distillates. After heating at reflux for 4 hours, a total of 346 ml distillate is collected. The viscous reaction solution is cooled to room temperature, diluted with N-methylpyrrolidone, and precipitated in water. The resulting solid is collected and washed twice with methanol. After air-drying overnight, the solid is dried in a vacuum oven at 20 inches (0.51 m) mercury and 120° C. for 3 hours and at 210° C. for 4 hours to yield 139.4 g of polymer product.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinyl pyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 22% polymer solution (based on weight) of the polymer prepared above in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 28° C.±1° C. Three membranes are prepared with dry times of 0.05 minute, 0.50 minute, and 1.00 minute, as described above. All membranes exhibit good adhesion between the layers.

The resulting membranes are washed in water for 24 hours, washed in methanol for 2 hours and washed in FREON®113 for 2 hours. The membranes are dried in a vacuum oven at 20 inches (0.51 m) mercury and room temperature overnight at 100° C. for 4 hours. All dry membranes exhibit good adhesion between the component layers.

The membrane fabrication procedure of this example demonstrates the applicability of the materials described therein for gas separation membranes.

EXAMPLE 40

This example illustrates the use of a polymer blend substrate containing a small amount of the separating layer polymer to improve the compatibility and adhesion between the separating and the substrate layers.

ULTEM®1000, a commercially available polymer from GE described in Example 18, is employed as the substrate. MATRIMID 5218, a commercially available polymer from Ciba Geigy believed to have the following structure

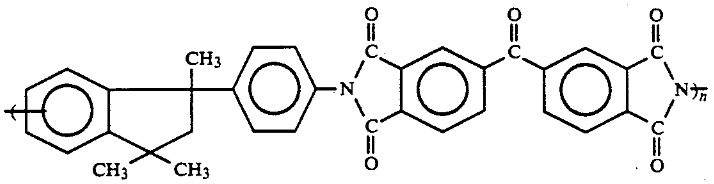

is employed as the separating layer.

A substrate solution containing 90:10 wt ULTEM:-Matrimid ratio is prepared according to the formulation: 30% by weight blend polymer and 6.0% by weight of tetramethylenesulfone, and 1.8% by weight of acetic anhydride are dissolved in N-methyl-2-pyrrolidone.

A separating polymer solution is prepared according to the formulation: 27% by weight MATRIMID 5218, 5.4% by weight of tetramethylenesulfone, and 1.6% by weight of acetic anhydride, in N-methyl-2-pyrrolidone.

The above solutions are coextruded through a composite fiber spinneret having fiber channel dimensions as set forth in Example 4. The separating polymer solution is extruded at a rate of 16 $cm^3$/hr, and the substrate polymer solution is extruded at a rate of 140 $cm^3$/hr. A solution of 90% by volume of N-methyl-2-pyrrolidone in water is injected into the bore of the fiber at a rate of 60 $cm^3$/hr while the spinneret is maintained at 85° C.

The spun bicomponent fiber is passed through an air-gap of 2.5 cm at room temperature into a water coagulation bath at 27° C. The composite fiber then is wound on a drum at a rate of 100 meters/min. The composite fiber then is washed with 50° C. water for about 12 hours and then solvent exchange dehydrate by using methanol and F-113 as described in U.S. Pat. Nos. 4,080,743; 4,080,744; and 4,120,098. The composite fiber is tested for mixed gas $O_2/N_2$ (21/79, mole) at 100 psi at 25° C. The fibers exhibit the following separation performance:

$O_2$ Productivity: 112 GPU $O_2/N_2$ Selectivity: 1.1

The composite fibers as described above then are treated to seal defects in the separating layer as taught in U.S. Pat. No. 4,230,463 which is incorporated herein by reference. The treatment involves contacting the outer surfaces of the fibers with 2.5% by weight solution of a polysiloxane of the tradename of SYLGARD 184, in FREON 113, decanting the solution, and drying the fibers in a vacuum oven at 20 inches mercury overnight. The composite fiber treated as above is retested for mixed gas $O_2/N_2$ (21/79 mole) at 100 psi feed from 25° C. The results are reported below:

$O_2$ Productivity: 5 GPU $O_2/N_2$ Selectivity: 6.5

EXAMPLES 41–47

To a stirred solution of 1,4-bis(4-aminophenoxy)benzene (116.8 g, 0.4 mol) in N-methylpyrrolidone (1000 ml) is added 5,5'-[2,2,2-trifluoro-1(trifluoromethyl)ethylidene]-bis-1,3-isobenzofurandione (179.38 g, 0.404 mol) under an inert atmosphere at room temperature. The gold-colored reaction solution became very viscous and is allowed to stir overnight at room temperature. A solution of acetic anhydride (163.34 g, 1.6 mol) and triethylamine (161.90 g, 1.6 mol) is added with rapid stirring at room temperature. After mixing over the weekend at room temperature, the very viscous reaction solution is diluted with additional N-methylpyrrolidone and precipitated in water. The resulting solid is collected and washed three times with water, washed twice with methanol and allowed to air dry overnight. The solid is further dried in a vacuum oven at 20 inches (0.51 m) mercury and 130° C. for 5 hours and at 240° C. for 3 hours to yield 278.06 g product. The polymer prepared above is found to be soluble in dimethylsulfoxide, meta-cresol, N,N-dimethylacetamide and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 24% polymer solution (based on weight) of the polymer prepared above in N-methylpyrrolidone is cast on top of the above film at 100° C. with a 20-mil ($5.1\times10^{-4}$ m) knife gap. After drying at 100° C. for the times noted in Table 4, the membranes are coagulated in a water bath at 24° C.±1° C. All membranes exhibit good adhesion between the layers.

The resulting membranes are washed in water for 24 hours, washed in methanol for 2 hours and washed in FREON® 113 for 2 hours. The membranes are dried in a vacuum oven at 20 inches (0.51 m) mercury and room temperatures overnight at 100° C. for 4 hours. All dry membranes exhibit good adhesion between the component layers.

The membranes prepared as above are tested for pure gas helium and nitrogen permeabilities at 100 psig (689 kPa), 25° C. The results are reported in Table 4.

TABLE 4

| Example | Dry Time (min) | PHe (GPU) | $PHe/PN_2$ |
|---|---|---|---|
| 41 | 0.05 | 468 | 3.6 |
| 42 | 0.50 | 675 | 2.6 |
| 43 | 1.00 | 542 | 3.8 |
| 44 | 2.00 | 339 | 7.9 |
| 45 | 3.00 | 302 | 2.8 |
| 46 | 4.00 | 173 | 3.7 |
| 47 | 4.50 | 57 | 63.3 |

Example 47 is further tested for mixed gas oxygen/nitrogen (21/79, mole) permeabilities at 100 psig (689 kPa), 25° C. The results are reported below:

$O_2$ Productivity: 8 GPU $O_2/N_2$ Selectivity: 3.2

The bicomponent membranes of Examples 43, 44, and 45 prepared as above are treated as taught in U.S. Pat. No. 4,230,463 to seal defects in the polyimide dense separating layer. This involves contacting the membrane with 5.0% (weight) SYLGARD 184 solution in cyclohexane, removing the membrane from said solution and drying the membrane in a vacuum oven at 20 inches (0.51 m) mercury and 55° C.±5° C. overnight.

The treated bicomponent membrane of Example 43 is tested for pure gas helium and nitrogen permeabilities at 100 psig (689 kPa), 23° C. The results are reported below:

He Productivity: 141 GPU $He/N_2$ Selectivity: 78.3

The treated bicomponent membrane of Example 44 is tested for pure gas helium and nitrogen permeabilities at 100 psig (689 kPa), 23° C. The results are reported below:

He Productivity: 98 GPU $He/N_2$ Selectivity: 54

The treated bicomponent membrane of Example 46 is tested for pure gas helium and nitrogen permeabilities at 100 psig (689 kPa), 23° C. The results are reported below:

He Productivity: 66 GPU $He/N_2$ Selectivity: 39

The membrane fabrication procedure of this example demonstrates the applicability of the materials described therein for gas separation membranes.

EXAMPLE 48

To a stirred solution of 4,4'-bis(4-aminophenoxy)biphenyl (25.0 g, 0.068 mol) in N-methylpyrrolidone (200 ml) is added 5,5'-[2,2,2-trifluoro-1-(trifluoromethyl)ethylidene]-1,3-isobenzofurandione (30.45 g, 0.069 mol) under an inert atmosphere at room temperature. The reaction became very viscous and additional N-methylpyrrolidone (200 ml) is added. After stirring overnight at room temperature, a solution of acetic anhydride (27.70 g, 0.27 mol) and triethylamine (27.4 g, 0.27 mol) is added with rapid stirring at room temperature. After stirring at room temperature for 2.5 hours, the reaction solution is diluted with additional N-methylpyrrolidone and precipitated in water. The resulting solid is collected and washed three times with water, washed twice with methanol and allowed to air dry overnight. The solid is further dried in a vacuum oven at 20 inches (0.51m) mercury and 120° C. for 5 hours and at 250° C. for 3 hours to yield 40.8 g product. The polymer prepared above is found to be soluble in dichloromethane, m-cresol, dimethylsulfoxide, N,N-dimethylacetamide and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 0 15-mil (3.8×10 m) knife gap at 95° C. After drying on the plate for 0.5 minutes at 95° C., a 22% polymer solution (based on weight) of the polymer prepared above in N-methylpyrrolidone is cast on top of the above film at 95° C. with a 20-mil ($5.1\times10^{-4}$ m) knife gap. After drying at 95° C. for four seconds, the membrane is coagulated in a water bath at 18° C. The membrane exhibits good adhesion between the polymer layers.

The resulting membrane is washed in water for 24 hours, washed in methanol for 2 hours and in FREON® 113 for 2 hours. The membrane is dried in a vacuum oven at 20 inches (0.51 m) mercury and room temperature overnight and at 100° C. for 4 hours.

Example 48 is tested for pure gas helium and nitrogen permeabilities at 100 psig (689 kPa), 25° C. Results are reported in Table 5.

TABLE 5

| Example | Dry Time (min) | PHe (GPU) | $PHe/PN_2$ |
|---|---|---|---|
| 48 | 0.06 | 413 | 17 |

EXAMPLE 49

To a stirred solution of 4,4'-(methylethylidene)bisaniline-A

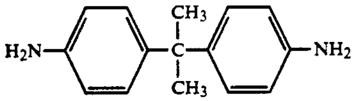

(45.2 g, 0.20 mol) in N-methylpyrrollidone (350 ml) is dropwise added a melted mixture of isophthaloyl dichloride:terephthaloyl dichloride (7:3, molar, 40.69 g, 0.20 mol) under an inert atmosphere. The reaction temperature is maintained at under 50° C. by control of the addition rate. The resulting reaction solution is stirred for 4 hours. To the resulting very viscous reaction solution is added lithium hydroxide monohydrate (20.98 g, 0.5 mol) and the resulting reaction mixture is mixed overnight at room temperature. The reaction solution is diluted with additional N-methylpyrrolidone and precipitated in water. The resulting solid is collected and soaked in water overnight, washed three times with water, washed three times with methanol and allowed to air dry overnight. The solid is further dried in a vacuum oven at 20 inches (0.51 m) mercury and 120° C. for 6 hours to yield 76.0 g product. The polymer prepared above is found to be soluble in dimethylsulfoxide, N-methylpyrrolidone, m-cresol, and dimethylacetamide.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^4$ m) ($38.4\times10$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^4$ m) knife gap at 100° C. After drying on the plate for 0.5 minutes at 100° C., a 24% polymer solution (based on weight) of the polymer prepared above in a 8.5% lithium nitrate solution (based on weight) in N-methylpyrrolidone is cast on top of the above film at 100° C. with a 20-mil ($5.1\times10^{-4}$ m) knife gap. After drying at 100° C.±3° C. for the time noted below, the membranes are coagulated in a water bath at 27° C.±1° C. Three membranes are prepared with dry times of 0.05 minute, 0.50 minute and 1.00 minute, as described above. All water-wet membranes exhibit excellent adhesion between the polymer layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The membranes exhibit excellent adhesion between layers.

The membrane fabrication procedure of this example demonstrates the applicability of the material described therein for gas separation membranes.

EXAMPLE 50

To a stirred solution of 3,4,-aminophenylether

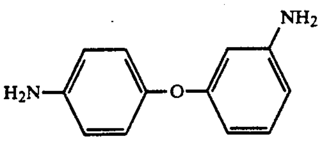

(20.02 g, 0.10 mol) in N-methylpyrrolidone (200 ml) dropwise added a melted mixture of isophthaloyl dichloride:terephthaloyl dichloride (7:3, molar, 20.50 g, 0.101 mol) under an inert atmosphere. The reaction temperature is maintained at under 50° C. by control of the addition rate. The resulting very viscous gold solution is stirred for 6.0 hours and then lithium hydroxide monohydrate (10.5 g, 0.25 mol) is added. The resulting reaction mixture is stirred overnight and then diluted with additional N-methylpyrrolidone and precipitated in water. The resulting solid is washed three times with water, washed twice with methanol, and allowed to air dry overnight. The solid is further dried in a vacuum oven at 20 inches (0.51 m) mercury and 120° C. for 5 hours. The polymer prepared above is found to be soluble in dimethylsulfoxide, N,N-dimethylacetamide, and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 24% polymer solution (based on weight) of the polymer prepared above in a 8.5% lithium nitrate solution (based on weight) in N-methylpyrrolidone is cast on top of the above film at 100° C. with a 20-mil ($5.1\times10^{-4}$ m) knife gap. After drying at 100° C.±3 C. for the time noted below, the membranes are coagulated in a water bath at 20° C.±1° C. Three membranes are prepared with dry times of 0.05 minute, 0.50 minute and 1.00 minute, as described above. All water-wet membranes exhibit good adhesion between the polymer layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The membranes exhibit good adhesion between layers.

The membrane fabrication procedure of this example demonstrates the applicability of the material described therein for gas separation membranes.

EXAMPLES 51-52

To a stirred solution of 2,4,6-trimethyl-1,3-phenylene diamine (15.02 g, 0.10 mol) and 1,3-bis(4-aminophenoxy)benzene (29.2 g, 0.10 mol) in dimethylsulfoxide (500 ml) is added 5,5'-[2,2,2-trifluoro-1-(trifluoromethyl) ethylidene]-1,3-isobenzofurandione (89.69 g, 0.202 mol) under an inert atmosphere at room temperature. The very viscous, light orange reaction solution is stirred at room temperature for 1.25 hours and then a solution of acetic anhydride (81.67 g, 0.80 mol) and triethylamine (80.95 g, 0.80 mol) is added with rapid stirring at room temperature. After stirring at room temperature overnight, the reaction solution is precipitated in water. The resulting solid is collected and washed twice with water, washed twice with methanol and allowed to air dry. The solid is further dried in a vacuum oven at 20 inches (0.51 m) mercury and 120° C. for 3 hours and at 250° C. for 5 hours to yield 122.6 g product. The polymer prepared above is soluble in acetone, dichloromethane, dimethylsulfoxide, N,N-dimethylacetamide and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

A film, prepared as above which is 1.1 ($2.8\times10\times10^{-5}$ m) mils thick, is tested for mixed gas oxygen/nitrogen (21/79, mole) permeabilities at 499 psig ($3.44\times10^{6}$ Pa), 25.0° C. The results are reported below:

$O_2$ Productivity: 200 centiBarrers $O_2/N_2$ Selectivity: 4.6

Multicomponent membranes are prepared from the polymer prepared above on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast onto a glass plate with a 15-mil ($3.8\times10^{-4}$ m) knife gap at 100° C. After drying on the plate for 0.5 minutes at 100° C., a 22% polymer solution (based on weight) of the polymer prepared above in N-methylpyrrolidone is cast on top of the above film at 100° C. with a 20-mil ($5.1\times10^{-4}$ m) knife gap. After drying at 100° C. for the time noted in Table 6, the membranes are coagulated in a water bath at 21° C. The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours.

Examples 51 and 52 are tested for pure gas helium, nitrogen, and carbon dioxide permeabilities at 100 psig (689 kPa), room temperature. The results are reported in Table 6. Example 51 is tested for mixed gas oxygen/-nitrogen (21/79, mole) permeabilities at 100 psig (689 kPa), 23° C. Results are reported in Table 6.

TABLE 6

| Example | Dry Time (min) | PHe (GPU) | PHe/ $PN_2$ | $PCO_2$ (GPU) | $PCO_2$/ $PN_2$ | $PO_2$ (GPU) | $PO_2$/ $PN_2$ |
|---|---|---|---|---|---|---|---|
| 51 | 0.5 | 323 | 36 | 155 | 17.3 | 36 | 3.3 |
| 52 | 1.0 | 400 | 13.6 | 196 | 6.7 | | |

The membrane fabrication procedure of these examples demonstrates the applicability of the material described therein for gas separation membranes.

EXAMPLE 53

To a stirred solution of 2,4,6-trimethyl-1,3-phenylene diamine (15.02 g, 0 10 mol) and 1,4-bis(4-aminophenoxy)benzene (29.2 g, 0.10 mol) in N-methylpyrrolidone (500 ml) is added 5,5'-[2,2,2-trifluoro-1-(trifluoromethyl)ethylidene]-1,3-benzofurandione (89.69 g 0.202 mol) under an inert atmosphere at room temperature. The very viscous reaction solution is stirred at room temperature for 3.5 hours and then a solution of acetic anhydride (81.67 g, 0.80 mol) and triethylamine (80.95 g, 0.80 mol) is added with rapid stirring at room temperature. After stirring overnight at room temperature, the reaction solution is precipitated in water. The resulting solid is collected and washed twice with water, washed twice with methanol, and allowed to air dry overnight. The solid is further dried in a vacuum oven at 20 inches (0.51 m) mercury and 120° C. for 3 hours and at 250° C. for 5 hours to yield 123.1 g of polymer product. The polymer prepared above is soluble in acetone, dichloromethane, dimethylsulfoxide, N,N-dimethylacetamide, and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$m) knife gap. After drying on the plate at 100° C.±21° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

A film, prepared as above which is 1.1 mils ($2.8\times10^{-5}$ m) thick, is tested for mixed gas oxygen/nitrogen (21/79, mole) permeabilities at 512 psig ($3.53\times10^{6}$ Pa), 24.5° C. The results are reported below:

$O_2$ Productivity: 400 centiBarrers $O_2/N_2$ Selectivity: 4.5

Multicomponent membranes are prepared from the above polymer on top of VICTREX 600P polyethersulfone (a product of ICI). A 25% VICTREX 600P polyether sulfone solution (based on weight) with 7.5% polyvinylpyrrolidone (M.W.=10,000) in N-methylpyrrolidone is cast on a glass plate with a 15-mil ($3.8\times10^{-4}$ m) knife gap at 97.5° C.±3.0° C. After drying on the plate for 15 seconds, a 22% polymer solution (based on weight) of the polymer prepared above in N-methylpyrrolidone is cast on top of the above film at 97.5° C.±3.0° C. with a 20-mil ($5.1\times10^{-4}$m) knife gap. After drying at 97.5° C.±3.0° C. one minute, the membrane is coagulated in a water bath at 25.0° C.±1.0° C. Good adhesion between the polymer layers is apparent.

The resulting membrane is washed in water for 24 hours, washed in methanol for 2 hours and washed in FREON® 113 for 2 hours. The membrane is dried in a vacuum oven at 20 inches (0.51 m) mercury and room temperature overnight and at 100° C. for 4 hours. The membranes exhibit good adhesion between the polymer layers.

The membrane is tested for pure gas helium, nitrogen, and carbon dioxide permeabilities and mixed gas oxygen/nitrogen (21/79, mole) permeabilities at 100 psig (689 kPa), 24° C. The results are reported in Table 7.

TABLE 7

| Example | Dry Time PSF (min) | Dry Time PI (min) | PHe (GPU) | PHe/ $PN_2$ | $PCO_2$ (GPU) | $PCO_2$/ $PN_2$ | $PO_2$ (GPU) | $PO_2$/ $PN_2$ |
|---|---|---|---|---|---|---|---|---|
| 53 | 0.25 | 1.0 | 428 | 20 | 231 | 11 | 60 | 3.1 |

The membrane fabrication procedure of this example demonstrates the applicability of the materials described therein for gas separation membranes.

Example 54

To a stirred solution of 4,4 (methylethylidene)bisaniline (45.2 g, 0.20 mol) in N-methylpyrrolidone (500 ml) is added 5,5,-[2,2,2-trifluoro-1-(trifluoromethyl)ethylidene]-1,3-isobenzofurandione (89.69 g, 0.202 mol) under an inert atmosphere at room temperature. After stirring at room temperature for 5 hours, a solution of acetic anhydride (81.67 g, 0.8 mol) and triethylamine (80.95 g, 0.80 mol) is added with rapid stirring. The resulting viscous reaction solution is stirred at room temperature overnight and then precipitated in water. The resulting solid is collected and washed twice with water, washed twice with methanol and allowed to air dry overnight. The solid is further dried in a vacuum oven at 20 inches (0.51 m) mercury and 120° C. for 4 hours and at 250° C. for 4 hours to yield 130.4 g product. The polymer prepared above is soluble in acetone, dichloromethane, m-cresol, dimethylsulfoxide, N,N-dimethylacetamide and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120 C. for 4 hours. The films are tough and flexible and can be creased without cracking.

Multicomponent membranes are prepared from the above polymer on top of VICTREX 600P polyethersulfone (a product of ICI). A 25% VICTREX 600P polyethersulfone solution (based on weight) with 7.5% polyvinylpyrrolidone (M.W. 10,000) in N-methylpyrrolidone is cast on a glass plate with a 15-mil ($3.8\times10^{-4}$m) knife gap at 100° C. After drying on the plate for 0.5 minutes at 100° C., a 22% polymer solution (based on weight) of the polymer prepared above in N-methylpyrrolidone is cast on top of the above film at 100° C. with a 20-mil ($5.1\times10^{-4}$m) knife gap. After drying at 100° C.±3° C. for the time noted below, the membranes are coagulated in a water bath at 15° C.±1° C. Three membranes are prepared with dry times of 0.05 minute, 0.50 minute and 1.00 minute, as described above. All membranes exhibit excellent adhesion between the polymer layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The membranes exhibit excellent adhesion between the component layers.

The membrane fabrication procedure of this example demonstrates the applicability of the materials described therein for gas separation membranes.

EXAMPLE 55

To a stirred solution of 4,4,-(methylethylidene) bisaniline (22.6 g, 0.10 mol) and 1,4-bis(4-aminophenoxy)biphenyl (37.28 g, 0.10 mol) in N-methylpyrrolidone (350 ml) is dropwise added a melted mixture of isophthaloyl dichloride:terephthaloyl dichloride (7:3, molar, 40.69 g, 0.20 mol) under an inert atmosphere. The reaction temperature is maintained at under 50° C. by control of the addition rate. The resulting very viscous light brown solution is stirred for 4.5 hours and then lithium hydroxide monohydrate (21 g, 0.5 mol) is added. The resulting reaction mixture is stirred overnight and then diluted with additional N-methylpyrrolidone and precipitated in water. The resulting solid is collected and washed three times with water, washed twice with methanol and allowed to air dry overnight. The solid is further dried in a vacuum oven at 20 inches (0.51 m) mercury and 117° C.±2° C. for 6 hours to yield 85.5 g product. The polymer prepared above is soluble in dimethylsulfoxide, m-cresol, N,N-dimethylacetamide and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$ m) knife gap. After drying on the plate at 100° C. ±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the above polymer on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast on a glass plate with a 15-mil ($3.8\times10^{-4}$ m) knife gap at 100° C. After drying on the plate for 0.5 minutes at 100° C., a 20% polymer solution (based on weight) of the polymer prepared above with 6.8% lithium nitrate solution (weight) in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 25° C.±1° C. Three membranes are prepared with dry times of 0.05 minute, 0.50 minute and 1.00 minute, as described above. All membranes exhibit excellent adhesion between the polymer layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The membranes exhibit excellent adhesion between the component layers.

The membrane fabrication procedure of this example demonstrates the applicability of the materials described therein for gas separation membranes.

EXAMPLE 56

To a stirred solution of 2,7-bis(4-aminophenoxy)-naphthalene (25.0 g, 0.073 mol) in N-methylpyrrolidone (200 ml) is dropwise added a melted mixture of isophthaloyl dichloride:terephthaloyl dichloride (7:3, molar, 15.14 g, 0.075 mol) under an inert atmosphere. The reaction temperature is maintained at under 50° C. by control of the addition rate. The resulting viscous solution is stirred for 1 hour after the final addition and then lithium hydroxide monohydrate (10.50 g, 0.25 mol) is added. The resulting reaction mixture is stirred overnight at room temperature, diluted with N-methylpyrrolidone and precipitated in water. The resulting white solid is collected and washed three times with water and twice with methanol. The resulting solid is air-dried overnight and then dried in a vacuum oven at 20 inches (0.51 m) mercury and 120° C. for 5 h to yield 34.64 g product. The polymer prepared above is soluble in N,N-dimethylacetamide and N-methylpyrrolidone.

Films of the polymer prepared above are cast from a 15% polymer solution (based on weight) in N-methylpyrrolidone onto a glass plate treated with Du Pont TEFLON® dry lubricant at 100° C.±2° C. with a 15-mil ($3.8\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the above polymer on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast on a glass plate with a 15-mil ($3.8\times10^{-4}$ m) knife gap at 100° C. After drying on the plate for 0.5 minutes at 100° C., a 20% polymer solution (based on weight) of the polymer prepared above in a 8.5% lithium nitrate solution (weight) in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 23° C.±1° C. Three membranes are prepared with dry times of 0.05 minute, 0.50 minute and 1.00 minute, as described above. All water-wet membranes exhibit excellent adhesion between the layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. All dry membranes exhibit excellent adhesion between the component layers.

The membrane fabrication procedure of this example demonstrates the applicability of the materials described therein for gas separation membranes.

EXAMPLE 57

To a stirred solution of 1,4-bis(4-aminophenoxy)-biphenyl (186.4 g, 0.5 mol) and 3,3'-aminophenylsulfone (124.2 g, 0.5 mol) in N,N-dimethylacetamide (2600 ml) is dropwise added a melted mixture of isophthaloyl dichloride:terephthaloyl dichloride (7:3, molar, 203.0 g, 1.0 mol) under an inert atmosphere. The reaction temperature is maintained at under 50° C. by control of the addition rate. The resulting very viscous dark solution is stirred 3.5 hours and then lithium hydroxide (88.1 g, 3.7 mol) is added. The resulting reaction mixture is stirred overnight at room temperature. The reaction solution is precipitated in water and the resulting solid is collected, washed twice with water, washed twice with methanol and allowed to air dry overnight. The solid is further dried in a vacuum oven at 20 inches (0.51 m) mercury and 120° C. for 5 hours to yield 457.2 g product. The polyamide prepared above is found to be soluble in dimethylsulfoxide, N,N-dimethylacetamide, and N-methylpyrrolidone.

Films of the polymer prepared above are cast from a 10% polymer solution (based on weight) in N-methylpyrrolidone onto a glass plate treated with Du Pont TEFLON ® dry lubricant at 100° C.±2° C. with a 0-mil ($5.1\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the above polymer on top of VICTREX 600P polyethersulfone (a product of ICI). A 25% VICTREX 0P polyethersulfone solution (based on weight) with 7.5% polyvinylpyrrolidone (M W.=10,000) in N-methylpyrrolidone is cast on a glass plate with a 15-mil ($3.8\times10^{-4}$ m) knife gap at 100° C. After drying on the plate for 0.5 minutes at 100° C., a 24% polymer solution (based on weight) of the polymer prepared above in a 8.5% lithium nitrate solution (weight) in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 19° C.±1° C. Three membranes are prepared with dry times of 0.05 minute, 0.50 minute and 1.00 minute, as described above. All water-wet membranes exhibit good adhesion between the layers.

The resulting membranes are washed in water for 24 hours, washed in methanol for 2 hours and washed in FREON ® 113 for 2 hours. The membranes are dried in a vacuum oven at 20 inches (0.51 m) mercury and room temperature overnight and at 100° C. for 4 hours. All dry membranes exhibit good adhesion between the component layers.

The membrane fabrication procedure of this example demonstrates the applicability of the materials described therein for gas separation membranes.

EXAMPLE 58

To a stirred solution of 1,4-bis(4-aminophenoxy)-biphenyl (279.57 g, 0.75 mol) and 2,4,6-trimethyl-1,3-phenylene diamine (37.56 g, 0.25 mol) in N,N-dimethylacetamide (2600 ml) and pyridine (200 ml) is dropwise added a melted mixture of isophthaloyl dichloride:terephthaloyl dichloride (7:3, molar, 205.05 g, 1.01 mol) under an inert atmosphere. The reaction temperature is maintained at under 50° C. by control of the addition rate. The resulting very viscous reaction solution is stirred 2.5 hours and then lithium hydroxide (88.14 g, 3.7 mol) is added. The resulting reaction mixture is mixed overnight at room temperature. The reaction solution is diluted with N-methylpyrrolidone and precipitated in water. The resulting solid is collected, washed twice with water, washed twice with methanol and allowed to air dry overnight. The solid is further dried in a vacuum oven at 20 inches (0.51 m) mercury and 120° C. for 5 hours to yield 448.4 g product. This polymer is found to be soluble in dimethylsulfoxide, N-methylpyrrolidone and N,N-dimethylacetamide.

Films of the polymer prepared above are cast from a 10% polymer solution (based on weight) in N-methylpyrrolidone onto a glass plate treated with Du Pont TEFLON ® dry lubricant at 100° C.±2° C. with a 20-mil ($5.1\times10^{-4}$ m) knife gap. After drying on the plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the above polymer on top of VICTREX 600P polyethersulfone (a product of ICI). A 25% VICTREX 600P polyethersulfone solution (based on weight) with 7.5% polyvinylpyrrolidone (M.W.=10,000) in N-methylpyrrolidone is cast on a glass plate with a 15-mil ($3.8\times10^{-4}$ m) knife gap at 100° C. After drying on the plate for 0.5 minutes at 100° C., a 24% polymer solution (based on weight) of the polymer prepared above in a 8.5% lithium nitrate solution (weight) in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 23° C.±1° C. Three membranes are prepared with dry times of 0.05 minute, 0.50 minute and 1.00 minute, as described above. All membranes exhibit excellent adhesion between the layers.

The resulting membranes are washed in water for 24 hours, washed in methanol for 2 hours and washed in FREON ® 113 for 2 hours. The membranes are dried in a vacuum oven at 20 inches (0.51 m) mercury and room temperature overnight and at 100° C. for 4 hours. The membranes exhibit good adhesion between the component layers.

The membrane fabrication procedure of this example demonstrates the applicability of the materials described therein for gas separation membranes.

EXAMPLE 59

To a stirred solution of 1,4-bis(4-aminophenoxy)-biphenyl (186.38 g, 0.50 mol) and 2,4,6-dithiomethyltoluene-1,3-diamine (a mixture of isomers, sold by Ethyl Corporation under the trade name ETHACURE 300, 107.25 g, 0.50 mol) in a solution of pyridine (200 ml) and N,N-dimethylacetamide (2600 ml) is dropwise added a melted mixture of isophthaloyl dichloride:terephthaloyl dichloride (209.11 g, 1.03 mol) under an inert atmosphere. The reaction temperature is maintained at under 50° C. by control of the addition rate. The resulting reaction solution is stirred for 5.0 hours and then lithium hydroxide (88.14 g, 3.7 mol) is added. The resulting reaction mixture is stirred overnight at room temperature and then precipitated in water. The resulting solid is collected, washed twice with water, washed twice with methanol and allowed to air dry overnight. The solid is further dried in a vacuum oven at 20 inches (0.51 m) mercury and 120° C. for 5 hours to yield 452.6 g product. The polyamide prepared above is found to be soluble in m-cresol, dimethylsulfoxide, N,N-dimethylacetamide and N-methylpyrrolidone.

Films of the polymer prepared above are cast from a 15% polymer solution (based on weight) in N-methylpyrrolidone onto a glass plate treated with Du Pont TEFLON ® dry lubricant at 100° C.±2° C. with a plate at 100° C.±2° C. for 0.5 hour, the films are further dried in a vacuum oven at 20 inches (0.51 m) mercury and room temperature overnight. The films are stripped off the plate and dried in a vacuum oven at 20 inches (0.51 m) mercury and 120° C. for 4 hours. The films are tough and flexible and can be creased without cracking.

Multicomponent membranes are prepared from the above polymer on top of VICTREX 600P polyethersulfone (a product of ICI). A 25% VICTREX 600P polyethersulfone solution (based on weight) with 7.5% polyvinylpyrrolidone (M.W. = 10,000) in N-methylpyrrolidone is cast on a glass plate with a 15-mil ($3.8\times10^{-4}$ m) knife gap at 100° C. After drying on the plate for 0.5 minutes at 100° C., a 24% polymer solution (based on weight) of the polymer prepared above in a 8.5% lithium nitrate solution (weight) in N-methylpyrrolidone is cast on top of the above film at 100° C. with a 20-mil ($5.1\times10^{-4}$ m) knife gap. After drying at 100° C.±3° C. for the times noted below, the membranes are coagulated in a water bath at 17° C.±1° C. Three membranes are prepared with dry times of 0.05 minute, 0.50 minute and 1.00 minute, as described above. All water-wet membranes exhibit good adhesion between the layers.

The resulting membranes are washed in water for 24 hours, washed in methanol for 2 hours and washed in FREON® 113 for 2 hours. The membranes are dried in a vacuum oven at 20 inches (0.51 m) mercury and room temperature overnight and at 100° C. for 4 hours. The membranes exhibit good adhesion between the component layers.

The membrane fabrication procedure of this example demonstrates the applicability of the materials described therein for gas separation membranes.

From the foregoing description, one skilled in the art can easily ascertain the essential characteristics of this invention, and without departing from the spirit and scope thereof, can make various changes and modifications of the invention to adapt it to various usages and conditions.

We claim:

1. A multicomponent membrane comprising, a porous polymeric substrate and a polyamide separating layer for separating gases, wherein said polyamide has the formula

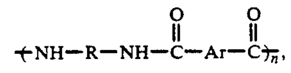

where R is one of either

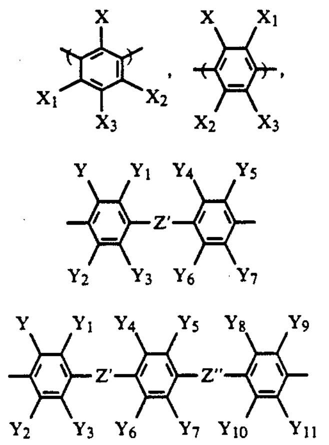

-continued

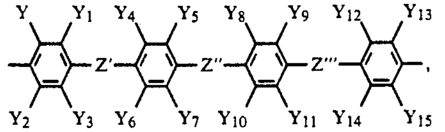

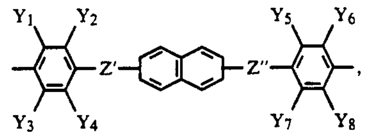

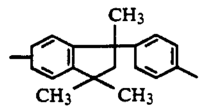

or mixtures thereof where Z', Z'', and Z''' are independently a carbon-carbon single bond,

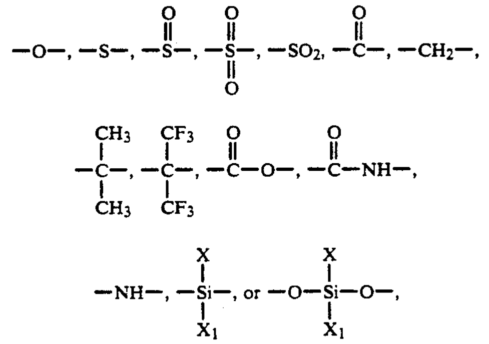

or mixtures thereof, Ar is

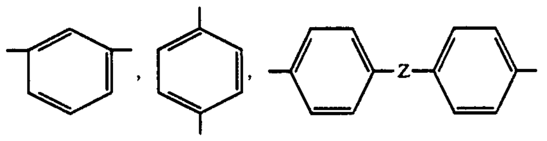

where Z is a carbon-carbon single bond,

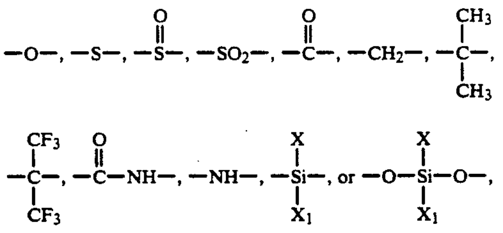

or mixtures thereof, n is an integer such that the polymer is of film-forming molecular weight, —X, —$X_1$, —$X_2$ and —$X_3$ are independently hydrogen, alkyl groups of 1 to 6 carbon atoms, alkoxy groups of 1 to 5 carbon atoms, phenyl or phenoxy groups, and —Y, —$Y_1$, —$Y_2$, —$Y_3$, —$Y_4$, —$Y_5$, —$Y_6$, —$Y_7$, —$Y_8$, —$Y_9$, —Y10, —Y11, —$Y_{12}$, —$Y_{13}$, —$Y_{14}$, —$Y_{15}$ independently are X, $X_1$, $X_2$, $X_3$, halogen, or alkyl groups of 1 to 6 carbon atoms.

2. The multicomponent membrane of claim 1 wherein said substrate is selected from the group of polysulfones, polyether sulfones, polyetherimide, polyimide, polyamide, polyesters, or mixtures thereof.

3. The multicomponent membrane of claim 1 wherein Ar is

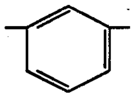
,
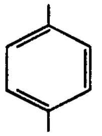

or mixtures thereof.

4. The membrane of claim 3 wherein —R— is a mixture of

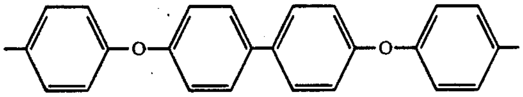

and

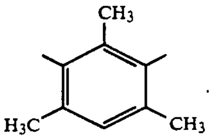

5. The membrane of claim 3 wherein —R— is a mixture of

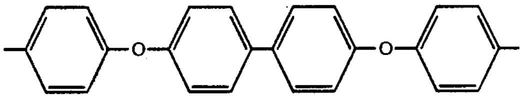

and

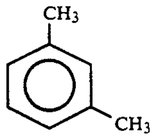

6. The multicomponent membrane of claim 1 wherein R is

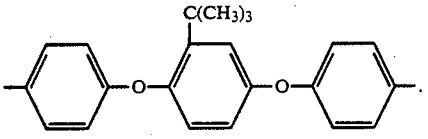

7. The multicomponent membrane of claim 1 where R is

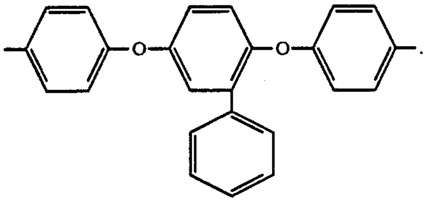

8. The membrane of claim 1 wherein R is

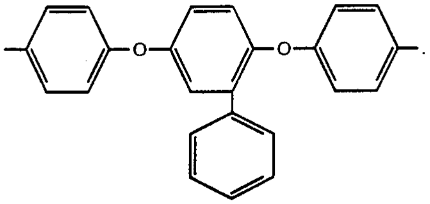

9. The membrane of claim 1 wherein —R— is

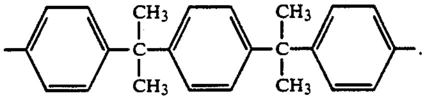

10. The membrane of claim 1 wherein —R— is

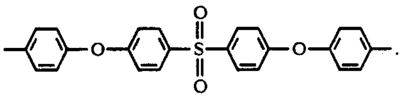

11. The membrane of claim 1 wherein —R— is

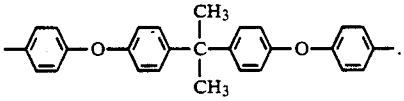

12. The membrane of claim 1 wherein —R— is

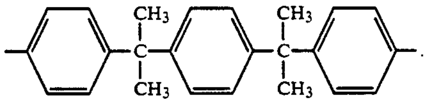

13. The membrane of claim 1 wherein —R— is a mixture of

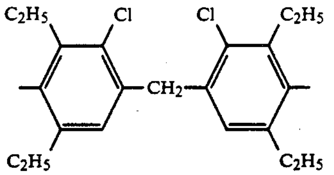

and

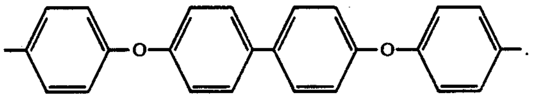

14. The membrane of claim 1 wherein —R— is a mixture of

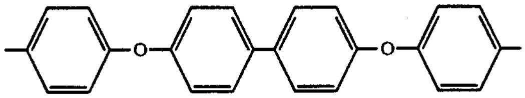

and

-continued

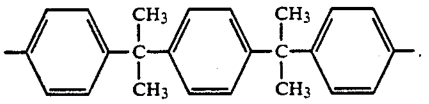

15. The membrane of claim 1 wherein —R— is a mixture of

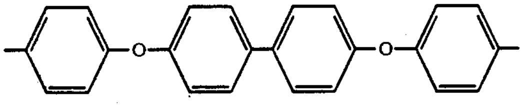

and

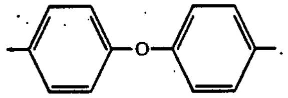

16. The membrane of claim 1 wherein —R— is

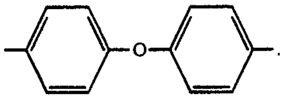

17. The membrane of claim 1 wherein —R— is a mixture of

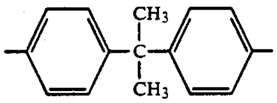

and

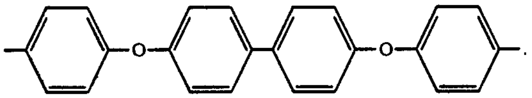

18. The membrane of claim 1 wherein —R— is

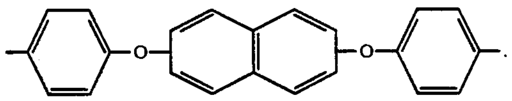

19. The membrane of claim 1 wherein —R— is a mixture of

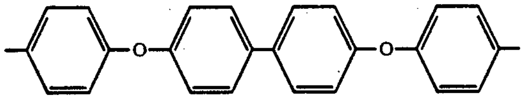

and

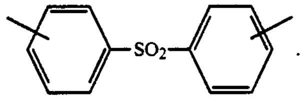

20. A multicomponent membrane comprising a porous polymeric substrate and a polyimide separating layer for separating gases wherein said polyimide is an aromatic polyimide comprising repeating units of the formula:

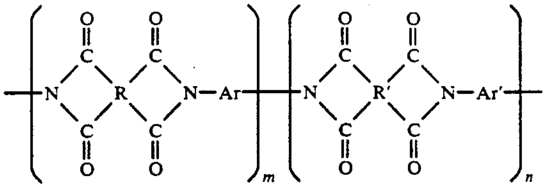

wherein R and R' are selected from the group

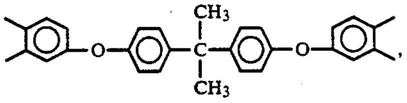

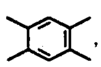 , 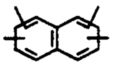 and 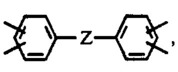

where —Z— is a carbon-carbon single bond,

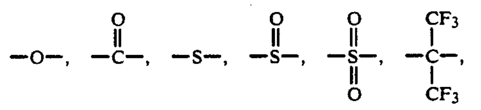 or alkylene groups of 1 to 5 carbon atoms, —Ar— is

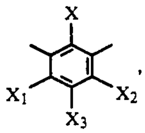 , 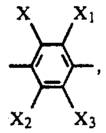

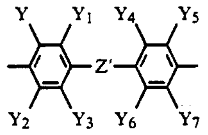

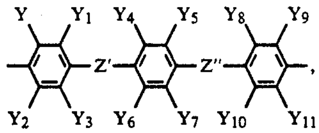

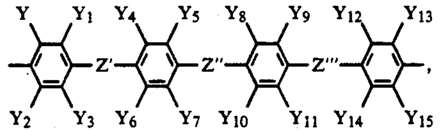

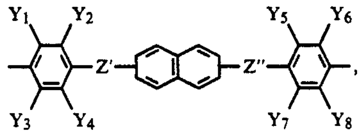

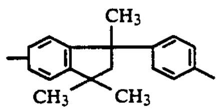

for mixtures thereof where Z', Z'', Z''' independently are a carbon-carbon single bond,

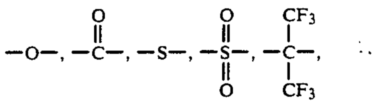

or alkylene groups of 1 to 5 carbon atoms, X, $X_1$, $X_2$ and $X_3$ are independently, hydrogen, alkyl groups of 1 to 5 carbon atoms, alkoxy groups of 1 to 5 carbon atoms, phenyl or groups, —Y, —$Y_1$, —$Y_2$, —$Y_3$, —$Y_4$, —$Y_5$, —$Y_6$, —$Y_7$, —$Y_8$, —$Y_9$, —$Y_{10}$, —$Y_{11}$, —$Y_{12}$, —$Y_{13}$, —$Y_{14}$, and —$Y_{15}$ independently are —X, —$X_1$, —$X_2$, —$X_3$ or halogen, —Ar'— is

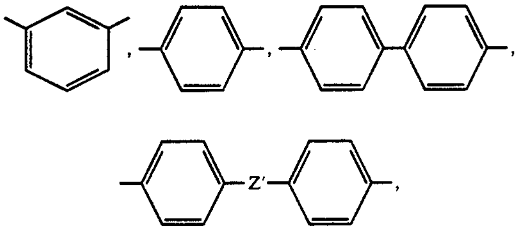

or mixtures thereof where Z' has the above-defined meaning, m is 0 to 100 mole percent, n is 0 to 100 mole percent, and $(m+n)=100\%$.

21. The membrane of claim 20 wherein m is 20 to 100 mole percent and n is 20 to 100 mole percent.

22. The membrane of claim 20 wherein said polymeric substrate is selected from the group of polysulfones, polyether sulfones, polyetherimide, polyimide, polyamide, polyesters, or mixtures thereof.

23. The membrane of claim 20 wherein R is

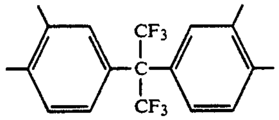

24. The membrane of claim 20 wherein —Ar— is a mixture of

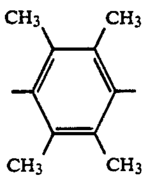

and

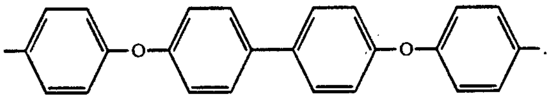

25. The membrane of claim 20 wherein —Ar— is

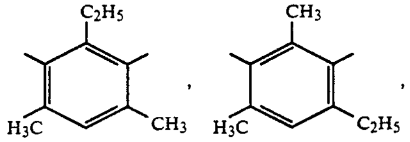

or mixtures thereof.

26. The membrane of claim 20 wherein —Ar— is

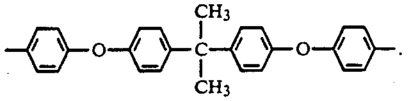

27. The membrane of claim 20 wherein —Ar— is

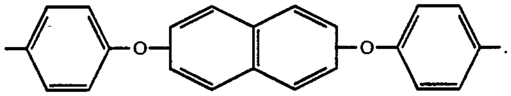

28. The membrane of claim 20 wherein —Ar— is

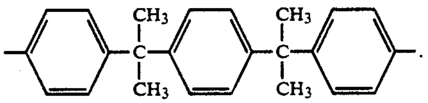

29. The membrane of claim 20 wherein —Ar— is

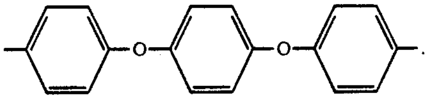

30. The membrane of claim 20 wherein —Ar— is

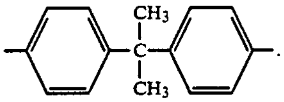

31. The membrane of claim 20 wherein —Ar— is

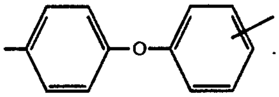

32. The membrane of claim 20 wherein —Ar— is

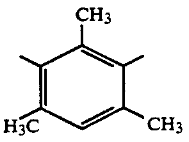

and

-continued

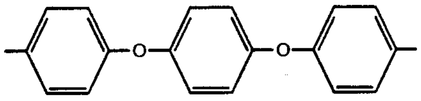

33. The membrane of claim 20 wherein R is

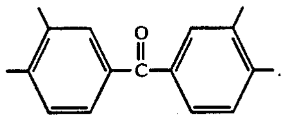

34. The membrane of claim 33 wherein —Ar— is a mixture of

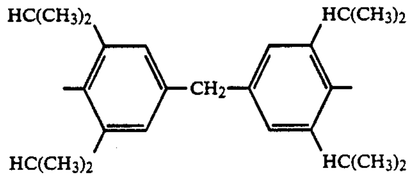

and

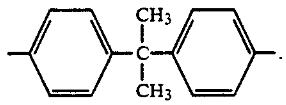

35. The membrane of claim 33 wherein —Ar— is

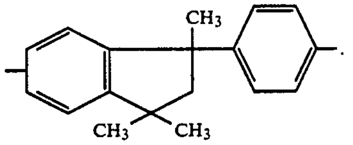

36. A process for manufacture of a multicomponent gas separation membrane, comprising providing a solution of a film forming polymer as a first supporting layer, said film forming polymer of said solution being selected from the group of polysulfones, polyether sulfones, polyetherimides, polyimides, polyamide, copolymers thereof, and blends thereof, applying to a surface of said first supporting layer a second solution of a film forming polymer to provide a separating layer to form a nascent membrane of at least two layers, said film forming polymer of said second solution being selected from the group of polyetherimide, polyimide, polyamide, polyesters, polycarbonates, copolycarbonate esters, polyphenylene oxides, polyamideimides, cellulose acetates, ethyl cellulose and mixtures thereof, coagulating said nascent membrane, and drying said nascent membrane to form a multicomponent gas separation membrane.

37. The process of claim 36 wherein said providing of said first layer and said applying of said second solution is performed by coextruding said first solution and said second solution.

38. The process of claim 37 wherein said coextruding yields a membrane in the form of a hollow fiber having said separating layer on the exterior of said fiber.

39. The process of claim 38 wherein said separating layer is in the form of an asymmetric membrane.

40. The process of claim 38 wherein said first layer is from about 25 to about 300 microns in thickness.

41. The process of claim 40 wherein said separating layer is from about 0.05 to about 150 microns in thickness.

42. The process of claim 41 wherein said separating layer is from about 0.05 to about 25 microns in thickness.

43. The process of claim 37 wherein said second solution contains from about 5 to about 50 weight percent film forming polymer.

44. The process of claim 37 wherein said first solution contains from about 15 to about 50 weight percent film forming polymer.

45. The process of claim 36 wherein said nascent membrane is dried to remove solvent from said separating layer prior to said coagulating.

46. The process of claim 36 wherein said film forming polymer of said first solution is selected from the group of polyether sulfones, polysulfones, polyimides, or mixtures thereof, and said film forming polymer of said second solution is a polyamide.

47. The process of claim 46 wherein said polyamide has the formula:

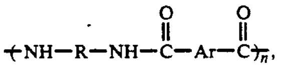

where R is one of either

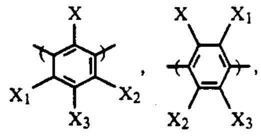

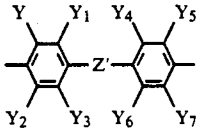

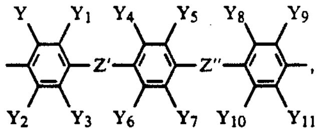

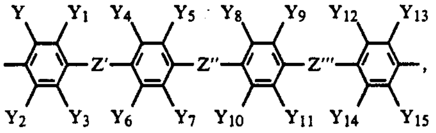

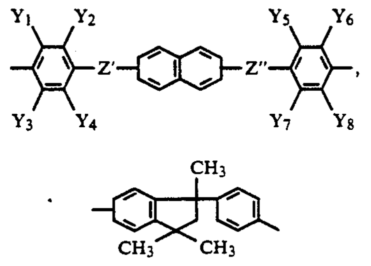

of mixtures thereof where Z', Z'', Z''' are independently a carbon-carbon single bond,

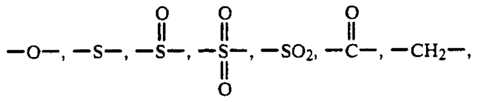

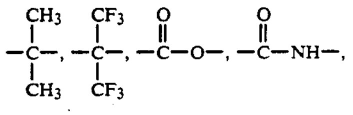

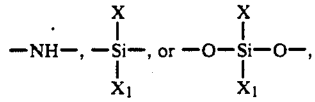

or mixtures thereof, Ar is

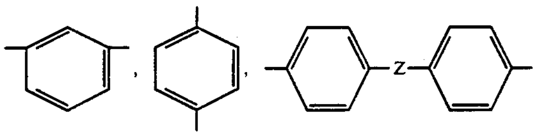

where Z is a carbon-carbon single bond,

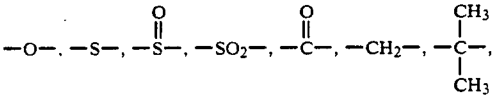

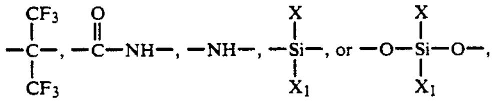

or mixtures thereof, n is an integer such that the polymer is of film-forming molecular weight, —X, —$X_1$, —$X_2$ and —$X_3$ are independently hydrogen, alkyl groups of 1 to 6 carbon atoms, alkoxy groups of 1 to 5 carbon atoms, phenyl or phenoxy groups, and —Y, —$Y_1$, —$Y_2$, —$Y_3$, —$Y_4$, —$Y_5$, —$Y_6$, —$Y_7$, —$Y_8$, —$Y_9$, —$Y_{10}$, —$Y_{11}$, —$Y_{12}$, —$Y_{13}$, —$Y_{14}$, —$Y_{15}$ independently are X, $X_1$, $X_2$, $X_3$, halogen, or alkyl groups of 1 to 6 carbon atoms.

48. The process of claim 47 wherein Ar is

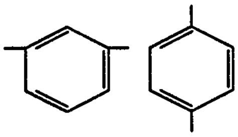

or mixtures thereof.

49. The process of claim 48 wherein R is

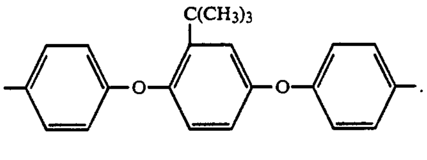

50. The process of claim 48 wherein —R— is

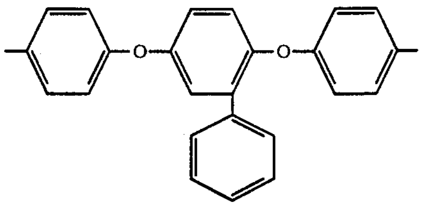

51. The process of claim 48 wherein —R— is

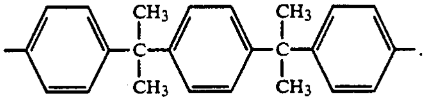

52. The process of claim 48 wherein —R— is

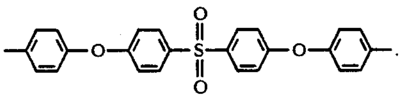

53. The process of claim 48 wherein —R— is

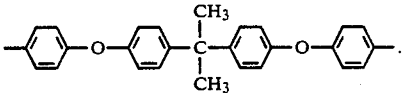

54. The process of claim 48 wherein —R— is

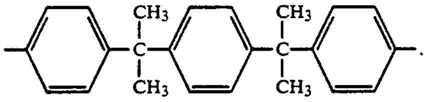

55. The process of claim 48 wherein —R— is a mixture of

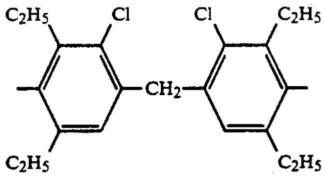

and

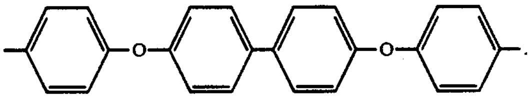

56. The process of claim 48 wherein —R— is a mixture of

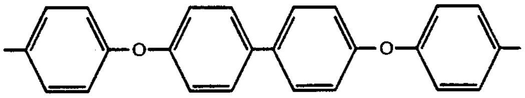

and

-continued

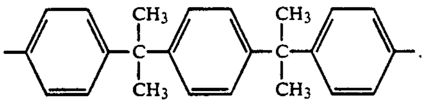

57. The process of claim 48 wherein —R— is a mixture of

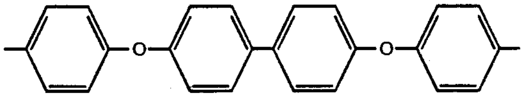

and

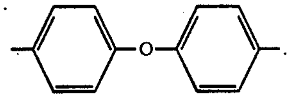

58. The process of claim 48 wherein —R— is

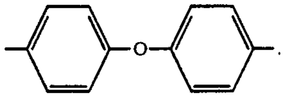

59. The process of claim 48 wherein —R— is a mixture of

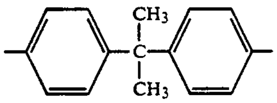

and

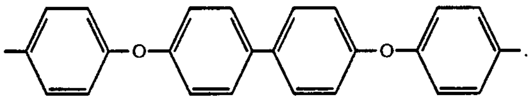

60. The process of claim 48 wherein —R— is

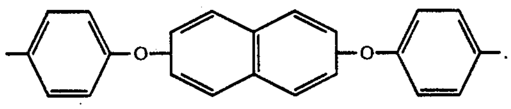

61. The process of claim 48 wherein —R— is a mixture of

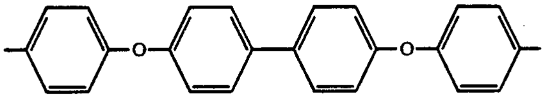

and

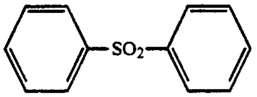

62. The process of claim 48 wherein —R— is a mixture of

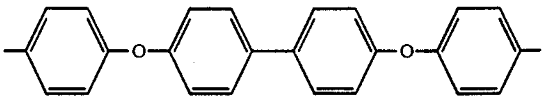

and

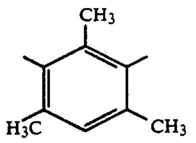

63. The process of claim 48 wherein —R— is a mixture of

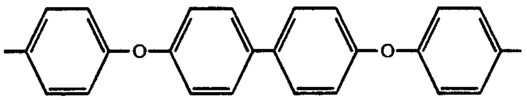

and

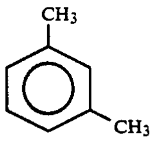

64. The process of claim 36 wherein said polyimide is an aromatic polyimide comprising repeating units of the formula:

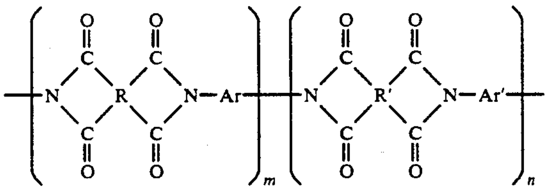

wherein R and R′ are selected from the group

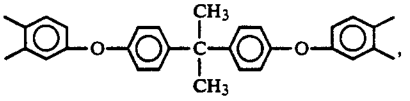

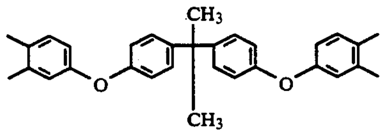

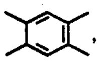, 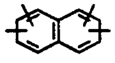 and 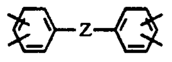

where —Z— is

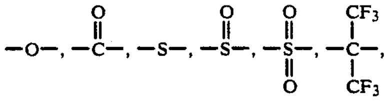

a carbon-carbon single bond or alkylene groups of 1 to 5 carbon atoms, —Ar— is one of either

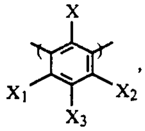

,

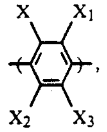

,

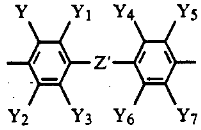

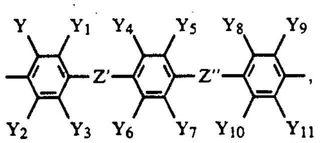

,

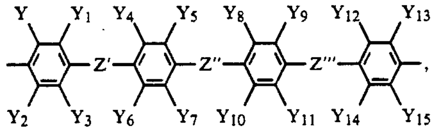

,

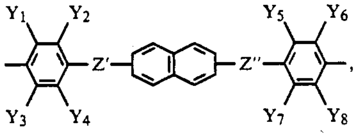

,

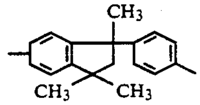

or mixtures thereof where Z′, Z″, Z‴ independently are a carbon-carbon single bond,

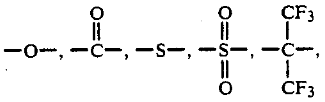

or alkylene groups of 1 to 5 carbon atoms, X, $X_1$, $X_2$ and $X_3$ are independently, hydrogen, alkyl groups of 1 to 5 carbon atoms, alkoxy groups of 1 to 5 carbon atoms, phenyl or phenoxy groups, —Y, —$Y_1$, —$Y_2$, —$Y_3$, —$Y_4$, —$Y_5$, —$Y_6$, —$Y_7$, —$Y_8$, —$Y_9$, —$Y_{10}$, —$Y_{11}$, —$Y_{12}$, —$Y_{13}$, —$Y_{14}$, and —$Y_{15}$ independently are —X, —$X_1$, —$X_2$, —$X_3$ or halogen, —Ar′— is

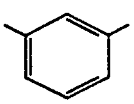

,

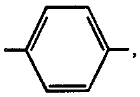

,

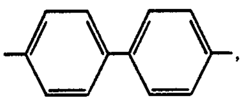

,

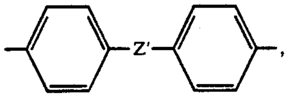

, or mixtures thereof where Z′ has the above-defined meaning, m is 0 to 100 mole percent, n is 0 to 100 mole percent, and (m+n)=100%.

65. The process of claim 64 wherein n is 0 to 20 percent and m is 0 to 80-100 percent.

66. The process of claim 64 wherein R is

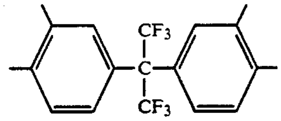

67. The process of claim 66 wherein —Ar— is a mixture of

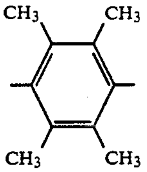

and

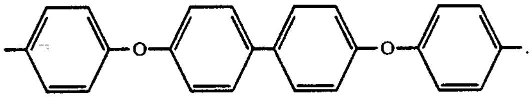

.

68. The process of claim 66 wherein —Ar— is

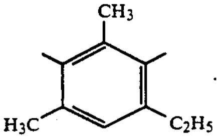

69. The process of claim 66 wherein —Ar— is

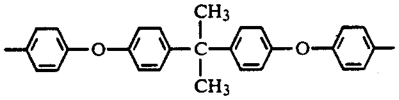

70. The process of claim 66 wherein —Ar— is

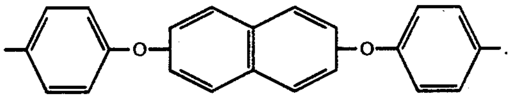

.

71. The process of claim 66 wherein —Ar— is

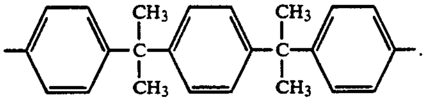

.

72. The process of claim 66 wherein —Ar— is

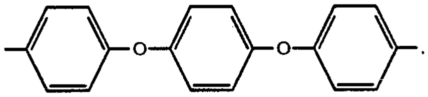

.

73. The process of claim 66 wherein —Ar— is

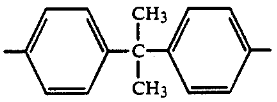
74. The process of claim 66 wherein —Ar— is
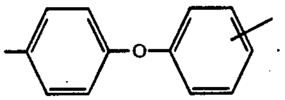
75. The process of claim 66 wherein —Ar— is a mixture of
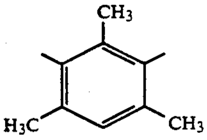
and
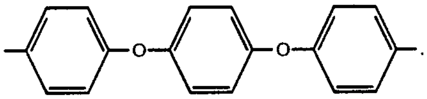
76. The process of claim 64 wherein R is
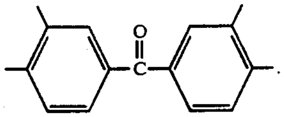
77. The process of claim 76 wherein —Ar— is a mixture of
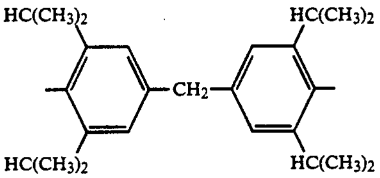
and
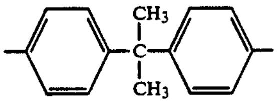
78. The process of claim 76 wherein —Ar— is
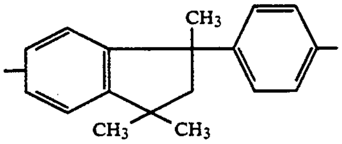
* * * * *

UNITED STATES PATENT AND TRADEMARK OFFICE
CERTIFICATE OF CORRECTION

PATENT NO. : 5,085,676

DATED : Feb. 4, 1992

INVENTOR(S) : Ekiner et al.

It is certified that error appears in the above-identified patent and that said Letters Patent is hereby corrected as shown below:

Column 53, line 1, "for" should be -- or --.

Column 53, line 14, after "phenyl or" insert -- phenoxy --.

Column 54, line 59, after "is" insert -- a mixture of --.

Title page, Item [73] please add -- L'Air Liquide, S.A., Paris France --

Signed and Sealed this

Eighth Day of June, 1993

Attest:

Michael K. Kirk

MICHAEL K. KIRK

*Attesting Officer*

*Acting Commissioner of Patents and Trademarks*